(12) United States Patent
Shimazu

(10) Patent No.: US 7,207,918 B2
(45) Date of Patent: Apr. 24, 2007

(54) CONTINUOUSLY VARIABLE TRANSMISSION

(76) Inventor: Tadahiro Shimazu, 1, Konohanacho 6-chome, Gifu-shi (JP) 500-8333

( * ) Notice: Subject to any disclaimer, the term of this patent is extended or adjusted under 35 U.S.C. 154(b) by 699 days.

(21) Appl. No.: 10/482,004

(22) PCT Filed: Jul. 10, 2002

(86) PCT No.: PCT/JP02/07027

§ 371 (c)(1),
(2), (4) Date: Dec. 24, 2003

(87) PCT Pub. No.: WO2004/008003

PCT Pub. Date: Jan. 22, 2004

(65) Prior Publication Data

US 2004/0176209 A1    Sep. 9, 2004

(51) Int. Cl.
*F16H 15/52* (2006.01)
(52) U.S. Cl. .............................. 476/18; 476/26; 476/55
(58) Field of Classification Search .................. 476/18, 476/26, 55, 67, 68; 475/185, 190
See application file for complete search history.

(56) References Cited

U.S. PATENT DOCUMENTS

| 197,472 A | 11/1877 | Hunt |
| 4,487,086 A | 12/1984 | Broziat |

FOREIGN PATENT DOCUMENTS

| FR | 1245647 | 9/1959 |
| JP | S54-12445 | 3/1979 |
| JP | 10-129517 | 6/1996 |
| JP | 11-146602 | 5/1999 |
| JP | 2000-170860 | 6/2000 |

OTHER PUBLICATIONS

Book: Corona Publishing Co., Ltd, Tokyo, Japan, Hirohisa Tanaka, "Torodial CVT" ISBN4-339-04550-0.

*Primary Examiner*—William C. Joyce
(74) *Attorney, Agent, or Firm*—Burns & Levinson, LLP; Jerry Cohen

(57) ABSTRACT

A mechanical continuously variable transmission in which the power roller is in "line contact" with the counter roller instead of conventional "pinpoint contact". By utilizing line contact of the power roller and the counter roller, the pressure force between the metal components of a mechanical continuously variable transmission can be reduced. In addition, the line contact also reduces extra energy for maintaining the operation thereof. The configuration of the roll surface of the power roller, which is rotated by a rotation axle connected to an input axle, is formed into a partial configuration of a sphere. A plurality of counter rollers, which are in line contact with the power roller having said roll surface, are arranged in a circle by a disk. Each counter roller is formed with a concave roll surface corresponding to the partial configuration of the sphere on the surface thereof. The counter rollers are driven to rotate by the rotation of the power roller in contact therewith. Each counter roller is assembled rotatably on the same periphery of the disk connected to an output axle so that the concave roll surfaces neighboring to each other roughly continue into a toric shape. A rotation axle of the power roller is adapted so as to be continuously inclined with respect to the disk.

10 Claims, 32 Drawing Sheets

Fig.9
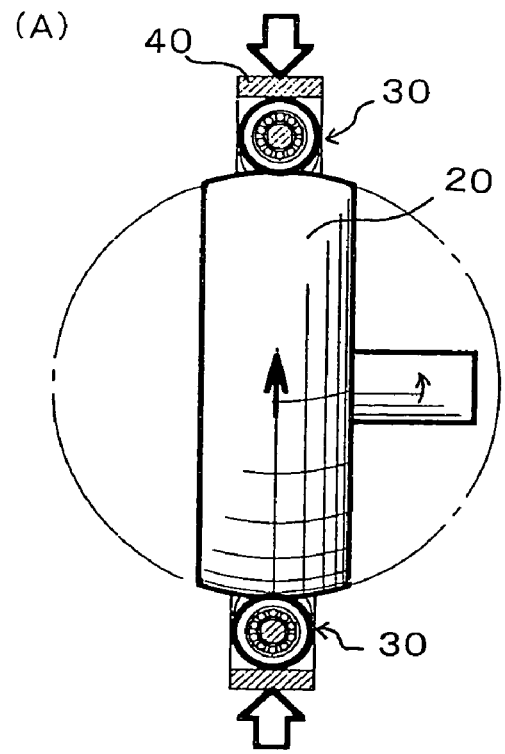
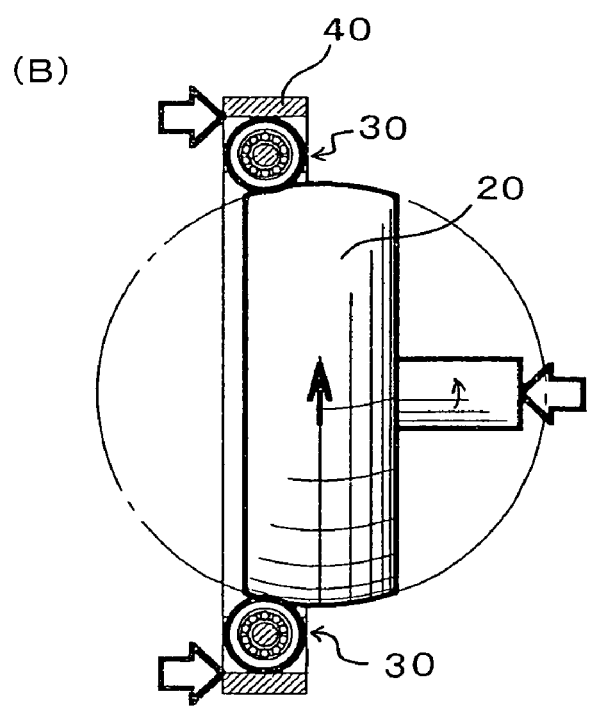

Fig.10
(A)
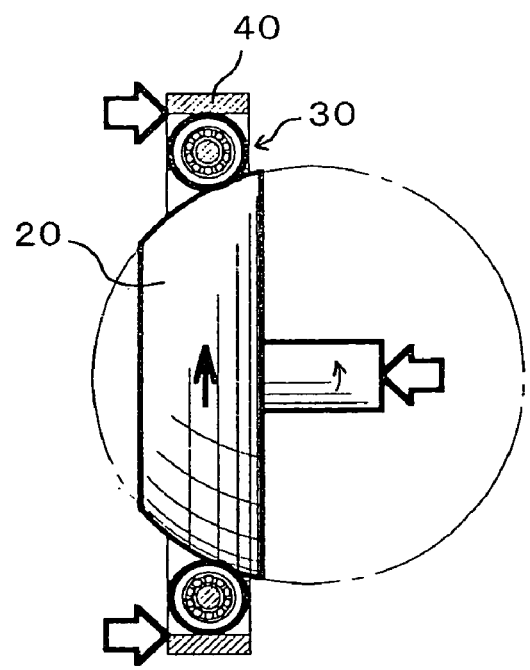
(B)
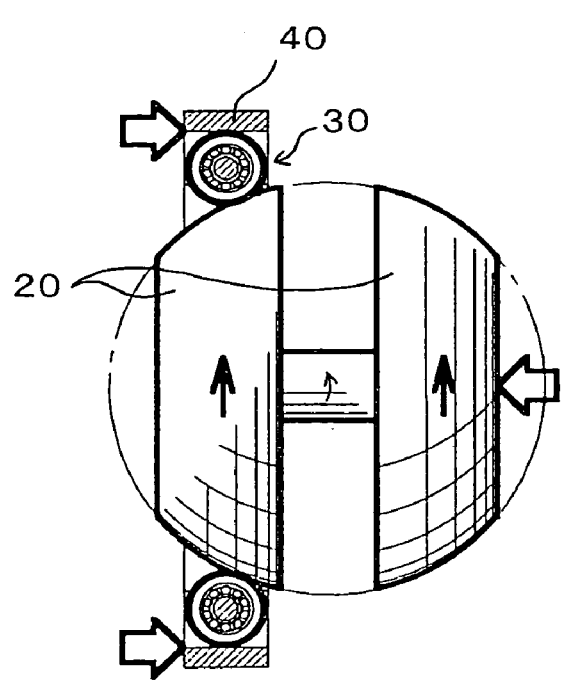

Fig.11
(A)
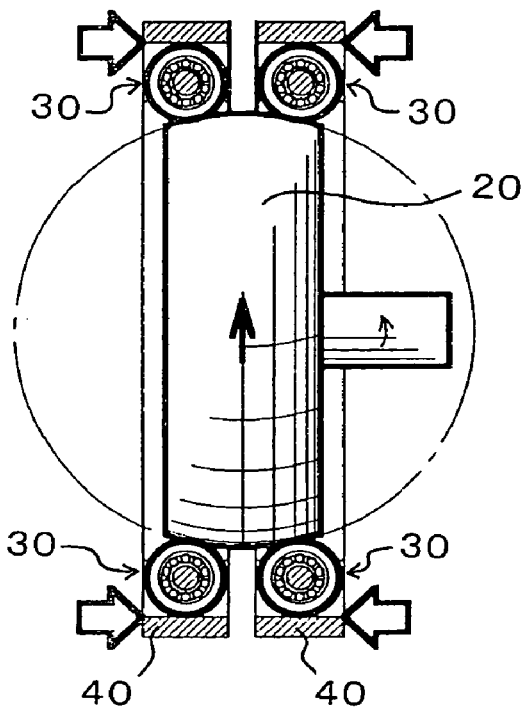
(B)
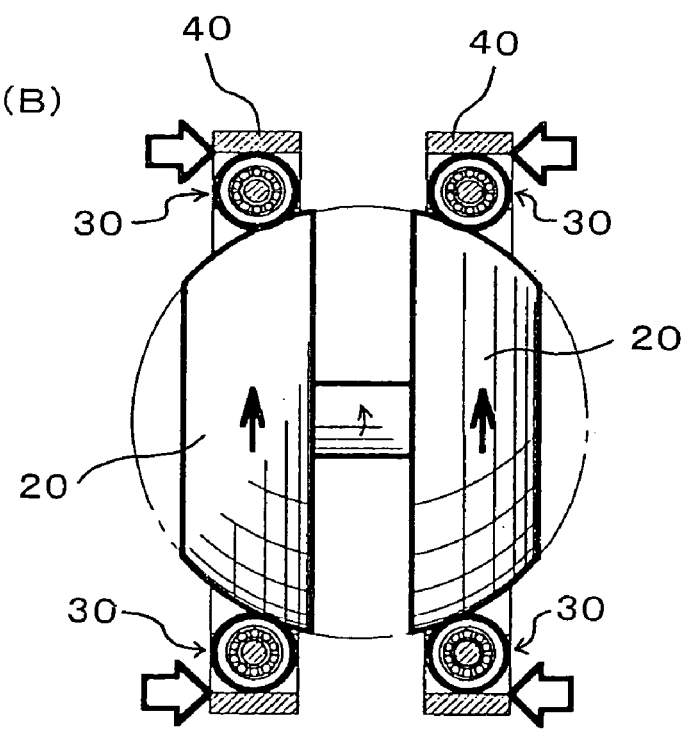

Fig.23
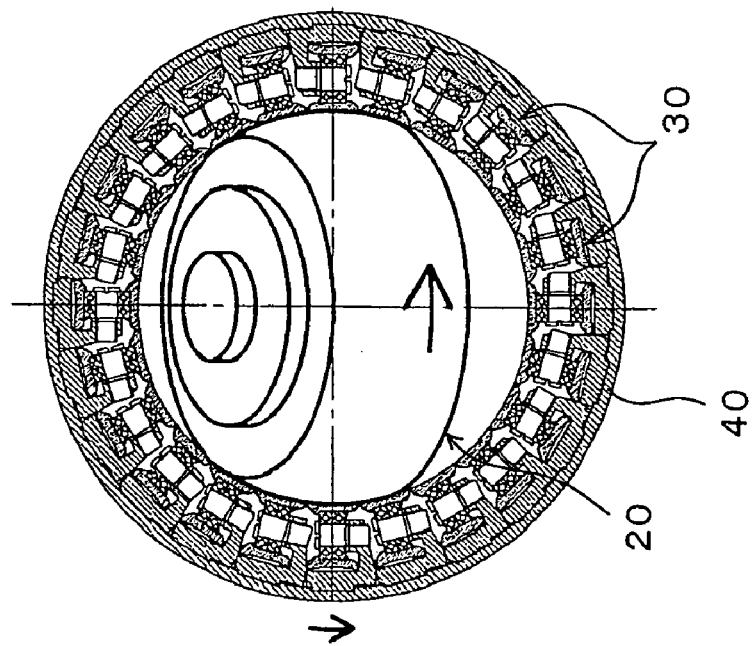
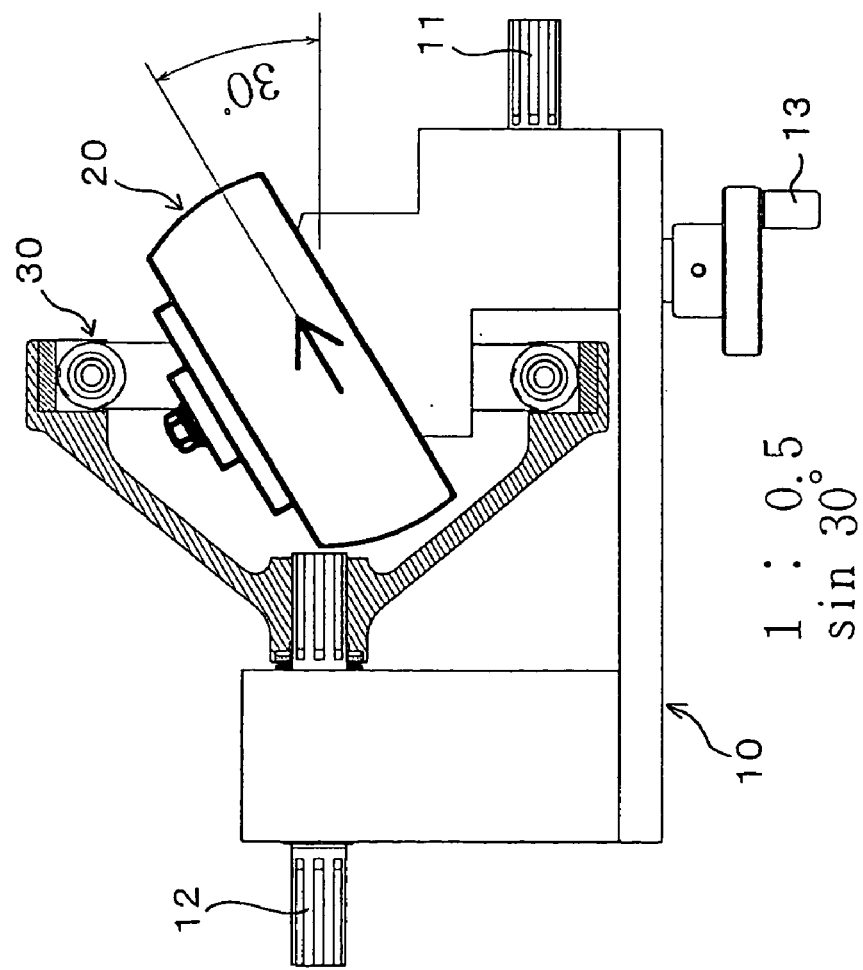

Fig.32
C. W. HUNT.
Counter-Shaft for Driving Machinery.
No. 197,472.   Patented Nov. 27, 1877.
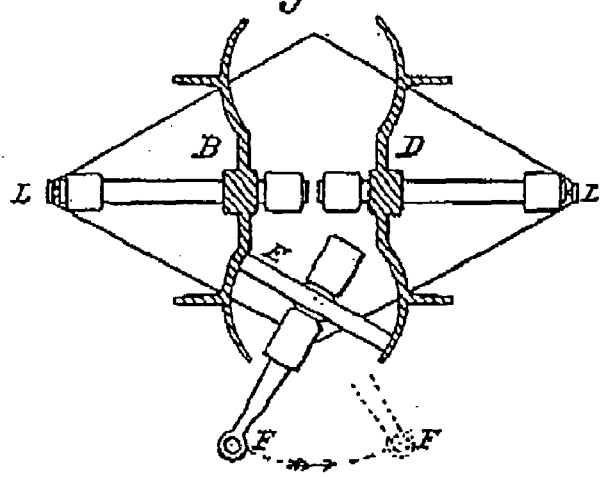
Fig. 1.
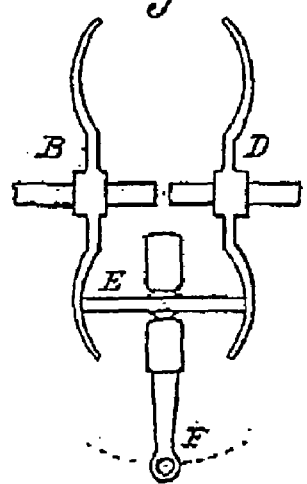
Fig. 3.
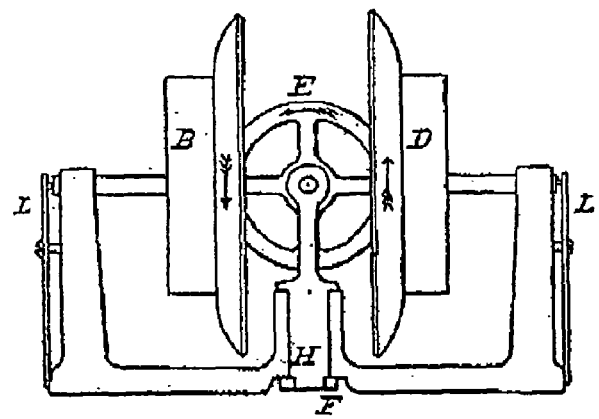
Fig. 2.
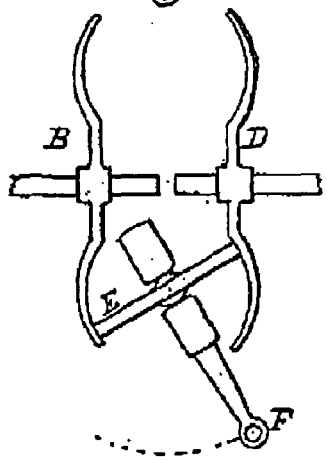
Fig 4

Full Toroidal CVT

Schematic geometry of Half Toroidal CVT

CONTINUOUSLY VARIABLE TRANSMISSION

TECHNICAL FIELD

The present invention relates to a continuously variable transmission that continuously transmits rotation and force (rotating torque) from input axle side to output axle side. In particular, the invention relates to a continuously variable transmission that shifts in any forward/reverse rotation direction from a state of idling (neutral) in a continuously variable manner.

BACKGROUND ART

The use of fluid transmissions, in which a fluid is used, and mechanical transmissions, in which a planetary gear set or the like is used, to transfer the rotating torque generated by an engine of, for example, an automobile, to the output axle at the wheel-side is well known. The mechanical transmissions can be broadly classified into two types. The first type uses a gear set and thereby gradually transmits the number of revolutions. The second type continuously transmits the number of revolutions.

The mechanical continuously variable transmission is classified in IPC F16 H (transmission apparatus) 15/00 "transmission apparatus for transmitting or reversing rotation having variable gear ratio by means of friction between rotational members," which also includes mechanical continuously variable transmissions using the "friction." Needless to say, since the IPC F16H 15/00 classification is further minutely classified, it is understood that a variety of such mechanical continuously variable transmissions using the friction have been proposed.

Recent developments in mechanical continuously variable transmissions have focused on toroidal Continuously Variable Transmissions (CVT), which are a type of a traction drive. The toroidal CVT was first proposed by Charies W. Hunt in U.S Pat. No. 197,472, which has the following basic characteristics. As shown in FIG. 32, a wheel E (hereinafter also referred to as power roller) that slides on disks B and D, which face each other and the inside surface of these disks is formed into a toroidal, i.e., doughnut-like shape, is disposed and by changing the angle of the wheel E, the sliding contact radius of the wheel E can be changed relative to the disk B and disk D sides. Thus, when the rotating torque of the disk B is transmitted to the disk D, the number of revolutions is changed between the disks B and D.

As described above, the toroidal CVT according to the Hunt patent has a toric (i.e. a toroidal shape, like a doughnut) as the entire configuration of the inner surface of the disks B and D. Hence, mechanical continuously variable transmissions that have a configuration like that of the Hunt patent, have been called as toroidal CVTs.

The toroidal CVT according to the Hunt patent, having the basic structure as shown in FIG. 32, is very simple and would have been suitable in a wide variety of industrial applications. There was some experimentation in the application of toroidal CVTs in the 1920s with the emergence of automobiles and various trial products and sales thereof also were made. However, for various reasons, widespread adoption of the toroidal CVT did not occur.

Since then, a variety of improvements to toroidal CVTs have been made. The configuration of the recent toroidal CVTs is largely classified into "full-toroidal" shown in FIG. 33 and "half-toroidal" shown in FIG. 34.

The characteristics of the full-toroidal CVT are basically the same as the Hunt patent. As shown in FIG. 33, the center (the center of the straight line connecting the contact points O and O' between the input and output disks) of the power roller (in FIG. 32, equivalent to the wheel E) goes through the center of a toroidal cavity formed by the inner surfaces of the disks. In this arrangement, because the pressure between the disks applied to transmit power between the input and output disks does not act on the support axle for relatively inclining the power rollers, the angle of the power roller can be changed smoothly. From an alternative perspective, because the two tangent lines drawn from each contact points 0 and 0' are parallel to each other, a large spin arises at the respective contact points.

On the other hand, in a half-toroidal CVT shown in FIG. 34, the two tangent lines from each of the contact points O and O'are not parallel to each other but have an intersection point E. When the intersection point E is on the rotation axle I, the spin at each contact point O, O' is eliminated, resulting in an effective CVT.

In any case, in a toroidal CVT, high pressure is exerted on the metal components in order to keep the components pressed against each other when they come into contact with each other at the shaded portions in FIG. 35 (TANAKA Hirohisa, "Toroidal CVT" (in Japanese), published in July 2000 by Corona Publishing). When the metals come into contact with each other at such small contact portions, as shown, friction heat is inevitably generated.

If there is no means to dissipate the friction heat, the metal components will eventually seize up on each other. Thus, it is necessary to interpose oil between the contact portions. Further, in the toroidal CVT, it is necessary to press the metal components (disk or roller) with an extremely strong pressure. Accordingly, the pressure of the oil interposed therebetween must also be correspondingly high. Thus, in the case where the toroidal CVT is applied to an automobile, the oil pressure would be increased, for example, by using the power of the engine, which, in turn, reduces, "fuel economy".

Furthermore, when a conventional CVToperates in "reverse" the speed cannot be shifted. It is desired to develop a continuously variable transmission capable of continuously shifting in any rotational direction i.e. (forward/reverse) from an idling state (neutral).

Accordingly, the inventor of the present invention examined recent toroidal CVTs from various viewpoints to evaluate approaches to solving the above-described problems with continuously variable transmissions. The inventor discovered that when a conventional toroidal CVT is used in an automobile fuel consumption increases because the metal components are in "pinpoint" contact with each other. Thus, leading to the present invention.

That is to say, an object of the present invention is to improve mechanical CVTs by arranging the metal components of the transmission so that the components come into "line contact" with each other rather than the conventional "pinpoint contact". As a result of the line contact between the components, another object of the present invention is to reduce the pressure exerted between the respective metal components. The reduction in pressure between the components results in a reduction in the extra energy needed to maintain the operation thereof. By reducing the pressure between the metal components, the fuel consumption of automobiles using a mechanical CVT can be reduced.

DISCLOSURE OF THE INVENTION

In order to achieve the above-mentioned objects of the invention, the means adopted in the invention according to claim 1 is described as follows, with the reference numerals and symbols used in the description of the best mode for carrying out the invention, which will be described later:

"A mechanical continuously variable transmission 100, capable of forward and reverse rotation, including a power roller 20 that is rotated by a rotation axle 22 connected to the input axle 11 side and a plurality of counter rollers 30, which are connected to an output axle 12 and are driven to rotate by the rotation of the power roller 20 coming into contact with the same, characterized in that:

the configuration of a roll surface 21 of the power roller 20 is formed into a partial configuration of a sphere, and a concave roll surface 31 corresponding to the partial configuration of the sphere is formed on the surface of each counter roller 30, the plurality of counter rollers 30 are assembled rotatably into the same periphery of a disk 40, which is connected to the output axle 12, so that each of the concave roll surfaces 31 neighboring each other roughly continues into a toric shape, and the rotation axle 22 of the power roller 20 is adapted so as to be continuously inclined with respect to the disk 40".

That is to say, the mechanical continuously variable transmission 100 of the present invention is, for example, as shown in FIGS. 1 and 2, arranged so that the roll surface 21 of the power roller 20, which is rotated by the turning force from the input axle 11, comes into "line contact" with each roll surface 31 of the plurality of counter rollers 30 assembled into the disk 40 in a toric shape. Therefore, in the mechanical continuously variable transmission 100 of the present invention the configuration of the roll surface 21 of the power roller 20 rotated by the input axle 11 is formed into roughly the same configuration as that of a surface that would be formed, for example, if a "sphere" were cut along two planes parallel to each other. On the other hand, the configuration of the roll surface 31 of each counter roller 30 is, as shown in FIG. 3, formed into a concave shape corresponding to the configuration of the roll surface 21 of the power roller 20. That is, the roll surface 31 of each counter roller 30 appears as a perfect "circular arc" if the same were cut off along the center axis of the counter roller.

Accordingly, the line of the roll surface 31 of each counter roller 30, which appears if the same were cut off at the center of the rotation axle 32, forms a substantially perfect "circle" wherein the plurality of counter rollers 30 are placed adjacent to each other and are disposed in a toric shape. Within this circle, the roll surface 21 of one or more power rollers 20 in a neutral position comes into line contact with the circular arc. When the power roller 20 is inclined, the roll surface 21 remains in line contact with the circular arc portions of the circle. Needless to say, since each of the counter rollers 30 is rotatably assembled into the disk 40 with the rotation axle 32, the same comes into "rolling contact" with respect to the power roller 20 on the drive side.

Here, comparing a first circle, which is formed by the roll surface 21 of the power roller 20, and a second circle, which is formed by the roll surfaces 31 constituting the torus by continuing the plurality of counter rollers 30, the relationship of the diameters of the first and second circles is as described below.

First, as shown in FIGS. 1 and 2, the roll surface 21 of the power roller 20 has, as shown in FIG. 3, a maximum portion including a circle $C_O$ which goes through the center O of the sphere and a minimum portion including a circle having a diameter smaller than that of the circle $C_O$. The maximum portion of the circle formed by the roll surface 21 of the power roller 20 may not always be the circle $C_O$ shown in FIG. 3; also, the minimum circle may have a radius of 0 (zero).

Also, since the power roller 20 fits within the torus formed by the counter rollers 30, for example, as shown in FIG. 10(A), the power roller must have some anti through-pass measures. Accordingly, the inner diameter of the torus of the counter rollers 30 has to be smaller than the outer diameter of the power roller 20. This is the case whether only one power roller 20 is used or a plurality of power rollers 20 are used.

The power roller 20 of the mechanical continuously variable transmission 100 has to incline the axial direction of the rotation axle 22 thereof with respect to the plane formed by the disk 40 while maintaining the roll surface 21 thereof in contact with each counter roller 30. In order to achieve this, a gearshift lever or handle 13 is connected to the rotation axle 22, and the rotation axle 22 and the input axle 11 are connected with each other using a bevel gear set or the like adopted in the best mode, which will be described later. Needless to say, since it is necessary to maintain the state of contact between the roll surface 21 of the power roller 20 and the roll surface 31 of the counter rollers 30, in addition to the positions of the power roller 20, the disk 40 and the like being maintained by the casing 10, for example, leaf springs 50 shown in FIG. 4(B) are used.

On the other hand, as for each counter roller 30, it is not absolutely necessary to change the direction of the rotation axle 32. However, at the same position of each roll surface 31 with respect to the disk 40, it is necessary to form a contact surface of toric shape to which the roll surface 21 of the power roller 20 having a circular arc shape comes into contact smoothly. As for each counter roller 30, since the roll surface 31 thereof forms only a partial circle, a plurality of counter rollers 30 has to be assembled into the disk 40 so as to rotate freely as shown in FIGS. 1 and 2. When the counter rollers 30 are completely assembled into the disk 40 as shown in FIG. 1, a toric surface is formed around the inner center by the contiguous roll surface 31 of each of the plural counter rollers 30.

By combining the power roller 20 and the plurality of counter rollers 30, the rotation from the input axle 11 can be transmitted to the output axle 12 provided to the disk 40 while shifting the speed as described below.

FIG. 5 shows, the transmission in "neutral". As shown in FIG. 5(B), the roll surface 21 of the power roller 20 is positioned at the same position as the toric surface formed by the counter rollers 30, the roll surface 21 of the power roller 20 comes into contact with three counter rollers 30 at the upper and lower surfaces respectively shown in FIG. 5(A). When the transmission is in neutral, the central counter roller 30 has the same center as the centerline, which is perpendicular to the rotation axle 22 of the power roller 20. Referring to the upper example in FIG. 5(A), the right and left counter rollers 30 are positioned at line symmetrical positions with respect to the centerline of the power roller 20.

When the power roller 20 is rotated in the direction indicated by the arrow in FIG. 5, each counter roller 30, which is brought into contact therewith, rotates, since it is rotatably supported by the disk 40 and brought into rolling contact with the power roller 20. A key point here is that the power roller 20 and each counter roller 30 are always in that state of "line contact". The reason of this is that the roll surface 21 of the power roller 20 is formed into the same configuration as a portion of the surface of a sphere and the roll surface 31 of concave shape corresponding thereto is formed on the counter rollers 30.

As shown in FIG. 5(A), the single rotating power roller 20 comes into contact with three counter rollers 30 respectively at the upper and lower points in FIG. 5(A), and rotates the counter rollers. Accordingly, in this case (specifically, in the case where the rotation axle 22 of the power roller 20 is perpendicular to the plane formed by the disk 40), since any force to rotate the disk 40 is not applied thereto, the disk 40, and accordingly the output axle 12 are not rotated.

In the case where the turning force from the input axle 11 is transmitted to the output axle 12 while being shifted, it is assumed that the rotation axle 22 of the power roller 20 is inclined leftward into a state shown in FIG. 6(B); i.e., up to 30° with respect to the plane formed by the disk 40. When the rotation axle 22, i.e., power roller 20 is inclined, the roll surface 21 moves sequentially from the counter rollers 30 with which the same has been in contact, to another neighboring counter roller 30 while maintaining the contact therewith. The reason of this is that the roll surface 21 of the power roller 20 is a part of a sphere; the roll surface 31 of the counter rollers 30 has a concave surface corresponding to the spherical surface of the roll surface 21; each counter roller 30 is assembled into the disk 40 into a toric shape; and each roll surface 31 roughly continues each other consecutively. While the power roller 20 is being inclined up to 30° with respect to the disk 40, the mechanical continuously variable transmission 100 shifts the speed continuously; the operation thereof will be described based on the state where the same is inclined up to 30°.

When the power roller 20, which is rotated by the input axle 11, is inclined up to the position of 30° with respect to the disk 40 as shown in FIG. 6(B), since the roll surface 21 of the power roller 20 is in line contact with the roll surface 31 of the counter rollers 30, the same acts to move the counter rollers 30 in the directions indicated by the small arrows shown in FIG. 6(A). That is to say, considering one counter roller 30, which is in contact with the power roller 20, where the roll surface 21 of the power roller 20 is inclined up to 30°, a rolling friction is applied to the roll surface 31 of the counter roller 30. A part of the rolling friction is used as a turning force of the counter roller 30 around the rotation axle 32 as the center; and the rest thereof is used as a turning force in the direction indicated by a small arrow shown in FIG. 6(A).

When a force in the direction indicated with dotted arrow is applied to each counter roller 30 to which the power roller 20 comes into contact, as a result, the disk 40 is rotated. In the case of the 30° inclination, with respect to the number of revolutions of the power roller 20, the number of revolutions of the disk 40 results in half thereof. As a result, the output axle 12, which is connected to the disk 40, is rotated at a shifted speed. Needles to say, the speed shift up to the 30° inclination is sequentially and continuously performed.

When the inclination of the power roller 20 is increased up to 90° as shown in FIG. 7(B), the entire turning force of the power roller 20 is used as the turning force to rotate the counter rollers 30 in the direction indicated with an arrow outside the figure in FIG. 7(A), and each counter roller 30 does not rotate with respect to the disk 40. That is, the number of revolutions of the power roller 20 becomes equal to the number of revolutions of the disk 40. Accordingly, in the case of 90° inclination, the speed is not shifted.

Needless to say, also during the period from the above-described 30° inclination to 90° inclination, the amount of rotation centered around the rotation axle 32 of the counter roller 30 becomes smaller sequentially; and the amount of rotation of the disk 40 becomes larger sequentially. As a result, the speed shift by the mechanical continuously variable transmission 100 is sequentially and continuously performed in accordance with the inclination amount of the power roller 20, resulting in a "continuous speed shift".

The key point in the present invention is the following fact; that is, as shown in FIG. 8, when the power roller 20 is inclined toward the opposite side of the inclination shown in FIG. 6(B), speed shift with additional "reverse rotation" is performed. That is, the mechanical continuously variable transmission 100 according to the present invention is capable of continuously performing speed shift from the state of idling (neutral) to any rotation direction (forward/reverse).

In the above description, it is assumed that the power roller 20 and the counter rollers 30 are both made of metal. However, the power roller 20 and the counter rollers 30 may also be implemented by forming at least the roll surfaces 21 and 31 thereof from synthetic resins or ceramics. Accordingly, the mechanical continuously variable transmission according to claim 1 is capable of performing continuous shift while making line contact between the power roller 20 and the counter rollers 30. Since line contact is made, it is possible to minimize the deformation of the roll surfaces 21 and 31 based on the Helz contact. Even when the power roller 20 and the counter rollers 30 are both made of metal material, the amount of heat generated can be reduced, and it is possible to perform the speed shift continuously from the neutral to any rotation direction (forward/reverse).

Next, the mechanical continuously variable transmission according to claim 2 is the above-described mechanical continuously variable transmission according to claim 1 in which "only one power roller 20 is provided, and the spherical diameter of the roll surface 21 of the power roller 20 is formed larger than the diameter of a torus formed inside by the counter rollers 30 so that the power roller 20 is pressed toward the disk 40 side".

That is, in the mechanical continuously variable transmission according to claim 2, as shown in FIGS. 9(B), 10 and 11, the only one power roller 20 is formed so that the maximum diameter portion of the roll surface 21 thereof (in other words, the diameter of the sphere forming the roll surface 21) is larger than the diameter of the inner torus formed by the counter rollers 30, and that, for example, when the power roller 20 is pressed toward the disk 40 into which the counter rollers 30 are assembled as shown in FIG. 9(B), to prevent the same from passing through toward the opposite side of the disk 40. Owing to this arrangement, the power roller 20 can be pressed toward the disk 40, and not only the line contact between the power roller 20 and each counter roller 30 is reliably performed but also the power roller 20 can be inclined in the state of being pressed. The example in FIG. 9(A) is the same as the example shown in the above-described FIG. 7(B), and is shown for the purpose of comparison with the example shown in FIG. 9(B).

The mechanical continuously variable transmission 100 shown in FIGS. 10(A) and 11(A) correspond to the "half-toroidal" type shown in FIG. 34, in which the center of the sphere defining the configuration of the roll surface 21 does not exist within the power roller 20. On the other hand, the mechanical continuously variable transmission 100 shown in FIGS. 10(B) and 11(B) apparently has two power rollers 20, but they serve as substantially a single power roller and the center of the sphere is included within these power rollers 20. Also, various methods to press the power rollers 20 toward the disk 40 may be adopted. Particular examples of the methods to press the power rollers 20 to the disk 40 will be described with respect to the mechanical continuously variable transmission 100 according to claim 6 or 7, which will be described later.

Accordingly, the mechanical continuously variable transmission according to claim 2 performs not only the same functions as that according to claim 1, but also, since it is arranged so that the single power roller 20 is pressed against the disk 40, the speed shift can be performed reliably and the size and number of components of the transmission can be reduced.

The mechanical continuously variable transmission according to claim 3 is the above-described mechanical continuously variable transmission according to claim 1 or 2 in which "a pair of the disks 40 attached with the counter rollers 30 respectively are assembled so as to be parallel to each other, and one power roller 20 is disposed between the pair of the disks 40, 40 so as to press the disks 40, 40 toward each other".

Thus, the mechanical continuously variable transmission according to claim 3, as shown in FIG. 11, two disks 40 to which a plurality of counter rollers 30 are attached respectively into a toric shape are assembled on both sides of a single or substantially single power roller 20 so as to be parallel to each other.

When two disks 40 are provided and by sandwiching the power roller 20 therewith, assembly of these components can be made easily, and, for example, by applying force to the two disks 40, the pressure on the power roller 20 can be achieved. Accordingly, the power roller 20 and the disk 40 do not have to be supported by the casing 10 for the purpose of pressing the same.

In the above examples, there is only one power roller 20 for transmitting the turning force from the input axle 11. However, a plurality of power rollers 20 may be used, as shown in the mechanical continuously variable transmission according to claim 4. That is, the mechanical continuously variable transmission according to claim 4 is the above-described mechanical continuously variable transmission according to claim 1 in which "a plurality of power rollers 20 having the same configuration are prepared, and these power rollers 20—20 are arranged so as to be rotated simultaneously in the same direction by the turning force from the input axle 11 side".

Taking examples in which two power rollers are used as the plurality of power rollers, examples shown in FIGS. 12–15 are conceivable. The example shown in FIG. 12 is arranged so that one power roller 20 shown in FIG. 1 is divided into two, and they are integrated with a separate casing or the like so as to allow the same to rotate simultaneously in the same direction. The mechanical continuously variable transmission 100 shown in FIG. 13 is arranged so that two power rollers 20 come into contact with the counter rollers at an angle from the inside thereof. As shown in FIG. 14, the power rollers come into contact with the counter rollers from the right beside thereof. The mechanical continuously variable transmission 100 shown in FIG. 15 is arranged so that two power rollers 20 come into contact with the counter rollers at the outer surface thereof respectively.

In the mechanical continuously variable transmission according to claim 4, since the power roller 20 is divided into a plurality of portions, it is possible to obtain a space for assembling various components inside the disk 40 or adjacent thereto. Furthermore, there is such merit that the contact direction of each power roller 20 with respect to the counter rollers 30 can be altered variously. Thus, the above facilitates assembly of the entire of mechanical continuously variable transmission 100 in manufacturing.

When the power roller 20 is divided into a plurality of portions as described above, it is made possible to allow the power rollers 20 to come in contact with the counter rollers from any direction of the disk 40 within the small casing 10. In such cases, it is necessary to alter the direction of each counter roller 30 exposed from the disk 40. This is achieved by the mechanical continuously variable transmission according to claim 5, and the adopted measures thereof are the above-described mechanical continuously variable transmission according to claim 4 in which "it is arranged so that the direction of each of the counter rollers 30 exposed from the disk 40 is changed and thereby the contact point of each power roller 20 with respect to each of the counter rollers 30 can be arbitrarily changed".

Accordingly, the mechanical continuously variable transmission according to claim 5 is arranged so that the contact points of the power rollers 20, which are divided into a plurality of portions, can be arbitrarily determined.

As described above, it is necessary to arrange so that the power roller 20 and the disk 40 which is assembled with the a plurality of counter rollers 30 press each other, and thereby the roll surfaces 21 of the power roller 20 always come into line contact with the roll surface 31 of each counter roller 30. As the measures for the above, the pressure force may be generated by a fluid-pressure or the same may be generated by a mechanical structure using a cam. In the best mode, which will be described later, it may be arranged like the mechanical continuously variable transmission according to claim 6 or 7.

That is to say, the mechanical continuously variable transmission according to claim 6 is the above-described mechanical continuously variable transmission according to any of claims 1–5 in which "it is arranged so that the pressure between each of the counter rollers 30 and the power roller 20 is made by leaf springs 50 interposed between a support axle 31 of each counter roller 30 and the disk 40 supporting the same".

For example, in the case of the mechanical continuously variable transmission 100 shown in FIG. 1, one power roller 20 is disposed at the center of the torus formed by the plurality of counter rollers 30. Therefore, when each of the counter rollers 30 positioned around the power roller 20 is biased toward the power roller 20, the pressure of the power roller 20 against the disk 40 can be achieved. Since each of the counter rollers 30 is supported by the rotation axle 32 thereof within the disk 40, the same is biased toward the power roller 20 if a leaf spring 50 is provided between the disk 40 and each rotation axle 32 as shown in FIG. 4.

As for the leaf spring 50, a bellville spring shown in FIG. 4(B) or a conical spring having wave-like shape may be used. In any case, the leaf spring 50 generates a biasing force in the direction of thickness of the leaf, and the same can be included within an extremely narrow space and generally several leaf springs, nested together, are used.

That is, since little free space is provided between each counter roller 30 and the disk 40, a "leaf spring" is the most effective spring for providing the biasing force. From the beginning, the power roller 20 and each of the counter rollers 30 are designed in a state that both are in close contact with each other. Accordingly, the space for pressuring them may be small. Under such conditions as described above, to arrange so that the disk 40 is pressed against the power roller 20, the leaf springs 50 are the most effective.

Another alternative pressuring method is that shown in FIGS. 16–25 depicting the first embodiment of the invention and is covered by claim 7.

That is, the measures adopted by the mechanical continuously variable transmission according to claim 7 are the above-described mechanical continuously variable transmission according to any of claims 1–5 in which "it is arranged so that the pressure between each of the counter rollers 30 and the power roller 20 is made by leaf springs 50 interposed between the disk 40 and a casing 10 supporting the same".

In the mechanical continuously variable transmission according to claim 7, shown in FIG. 16, the power roller 20, connected to the input axle 11, is completely assembled with the casing 10. That is, the power roller 20 is assembled so that the center of the sphere defining the roll surface 21 of the power roller 20 is immobile. When each of the counter rollers 30 is pressed against the power roller 20 as described above, close contact between the power roller 20 and the counter roller 30 can be obtained satisfactorily. Accordingly, it is sufficient that the counter roller 30 side, i.e., the disk 40 supporting the same is arranged to be biased toward the power roller 20.

In the example shown in FIG. 16, although the output axle 12 is rotatable with respect to the casing 10, it is arranged using a bearing so that the same does not move in the right/left direction in the figure to prevent the same from being pulled off. In the inner end of the output axle 12, splines are formed, and an arm of the disk 40 is meshed therewith. That is, the disk 40 is assembled so as to be movable in the axial direction of the output axle 12 with respect to the inner end thereof, but immobile with respect to the output axle 12.

In the mechanical continuously variable transmission 100 shown in FIG. 16, a plurality of leaf springs 50 are assembled between the inner end of the inner ring of the bearing incorporated within the casing 10 and the outer end of the arm of the disk 40. These leaf springs 50 are warped in the right/left direction in FIG. 16; thereby the disk 40 is biased just a little toward the power roller 20.

Accordingly, the mechanical continuously variable transmission according to claim 7 is capable of biasing the disk 40 assembled with a plurality of counter rollers 30 against the power roller 20 of which position is fixed by means of a quite small component such as a leaf spring 50. Thus, the line contact between the power roller 20 and each counter roller 30 can be stably maintained.

In the mechanical continuously variable transmission 100 shown in FIG. 16, splines are formed in the inner end of the output axle 12, and the arm of the disk 40 is meshed therewith. That is to say, when a means that moves the arm in the direction opposite to the biasing direction of the leaf springs 50 is provided, it is possible to release the contact between the power roller 20 and each of the counter roller 30 to eliminate torque transmission; i.e., a "clutch operation" is achieved. It is the mechanical continuously variable transmission 100 according to claim 8, which is arranged so as to achieve the clutch operation.

That is, the means adopted in the invention according to claim 8 is the above-described mechanical continuously variable transmission according to any of claims 1–7 in which "either the power roller 20 or each of the counter rollers 30 is adapted so as to be movable in the opposite direction of the pressure to provide such clutch function that either the power roller 20 or each of the counter rollers 30 is moved toward the opposite direction of the pressure and that thereby the friction contact between the power roller 20 and each of the counter rollers 30 is released to eliminate the transmission of the force therebetween".

BRIEF DESCRIPTION OF THE DRAWINGS

FIG. 7 shows the case where the power roller 20 is inclined at an angle of 90°; and FIG. 8 shows the case where the power roller 20 is inclined at an angle of −30°, respectively.

FIG. 9 shows an example in which one power roller 20 is used; (A) is a schematic view showing the case where the largest portion of the power roller 20 come into contact with each counter roller 30, and (B) is a schematic view showing the case where portions smaller than the largest portion of the power roller 20 come into contact with each counter roller 30. FIG. 10 shows an example in which portions smaller than the largest portion of the power roller 20 come into contact with each counter roller 30; (A) is a schematic view showing the case where one power roller 20 is used, and (B) is a schematic view showing the case where two power rollers 20, which serve as substantially one roller, are used. FIG. 11 shows the case where two disks 40, which are parallel with each other, are disposed on both sides of the power roller 20; (A) is a schematic view showing the case where one power roller 20 is used, and (B) is a schematic view showing the case where two power rollers 20 are used.

FIG. 12 shows an example in which each power roller 20 is brought into contact with a torus formed with the counter rollers 30; FIG. 13 shows an example in which each power roller 20 is brought into contact at an angle with the inner side of the torus; FIG. 14 shows an example in which each power roller 20 is brought into contact with a position where it is perpendicular to the disk 40; and FIG. 15 shows an example in which each power roller 20 is brought into contact with counter rollers 30 from both upper/lower sides thereof.

FIG. 16 is a transverse sectional plan view of the mechanical continuously variable transmission 100;

FIG. 17 is a front elevation of a disk 40 assembled with counter rollers 30; FIG. 18 is a longitudinal section side view of the disk 40; FIG. 19 is a partial transverse cross section showing an interconnection relationship between an input axle 11 and one power roller 20; FIG. 20 is a partial longitudinal section taken along the line 2-2 in FIG. 19 showing the interconnection relationship between the input axle 11 and the power roller 20; and FIG. 21 is a transverse cross section taken along the line 2-3 in FIG. 19 showing the inclination mechanism of the power roller 20 with respect to the input axle 11.

FIGS. 22–25 show one power roller 20 and its relation to the disk 40; (A) is a transverse sectional plan view thereof; and (B) is a longitudinal front elevation thereof, respectively; FIG. 22 shows the case where the power roller 20 is positioned perpendicular to the disk 40; FIG. 23 shows the case where the power roller 20 is inclined at an angle of 30°; FIG. 24 shows the case where the power roller 20 is positioned parallel to the disk 40; and FIG. 25 shows the case where the power roller 20 is inclined at an angle of −15°.

FIG. 26 is a longitudinal front elevation of the mechanical continuously variable transmission 100; FIG. 27 is a longitudinal front elevation of the mechanical continuously variable transmission 100 viewed on a plane orthogonal with respect to the case in FIG. 26, and FIG. 28 is a plan view taken along the line 4—4 in FIG. 26.

FIG. 32 is a drawing used in Hunt patent.

DESCRIPTION OF REFERENCE NUMERALS

Figure 1:
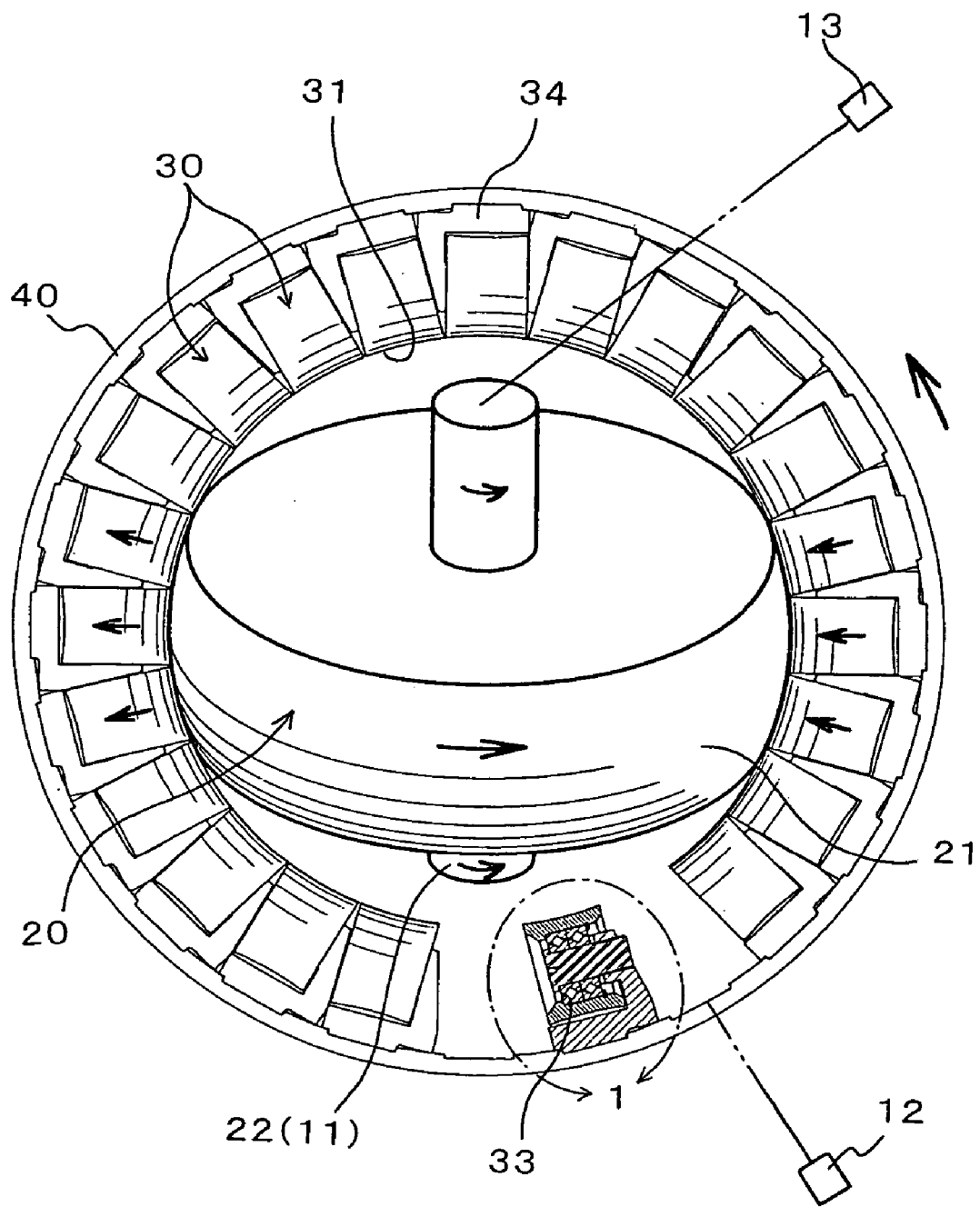
FIG. 1 is a partial cutaway view of the front elevation showing an example of a relationship between a power roller 20 and a plurality of counter rollers 30 in a mechanical continuously variable transmission 100 according to the present invention.

100 . . . mechanical continuously variable transmission, 10 . . . casing, 11 . . . input axle, 12 . . . output axle, 13 . . . gearshift lever or handle, 14 . . . bearing, 15 . . . inclination axle, 16 . . . sleeve, 20 . . . power roller, 21 . . . roll surface, 22 . . . rotation axle, 23 . . . opening, 30 . . . counter roller, 31 . . . roll surface, 32 . . . rotation axle, 33 . . . bearing, 34 . . . base, 40 . . . disk, 50 . . . leaf spring, 60 . . . turning force transmission mechanism, 61 . . . intermediate axle, 62 . . . free bevel gear, 63 . . . fixed bevel gear, 84 . . . center axle, 70 . . . inclination mechanism, 71 . . . base, 72 . . . bearing, 73 . . . turning axle, 74 . . . worm, 75 . . . worm wheel.

BEST MODE FOR CARRYING OUT THE INVENTION

The inventions described above, will be described in connection with a mechanical continuously variable transmission 100, which is a best mode for carrying out the invention shown in the drawings. FIGS. 16–25 show a first embodiment of the mechanical continuously variable transmission 100, respectively, according to the present invention. Also, FIGS. 26–31 show a second embodiment of the mechanical continuously variable transmission 100 respectively. Since each invention is included in the mechanical continuously variable transmission 100, which is the best mode for carrying out the invention, the best mode of the mechanical continuously variable transmission 100 will be described below in a first embodiment and a second embodiment separately.

First Embodiment

Figure 2:
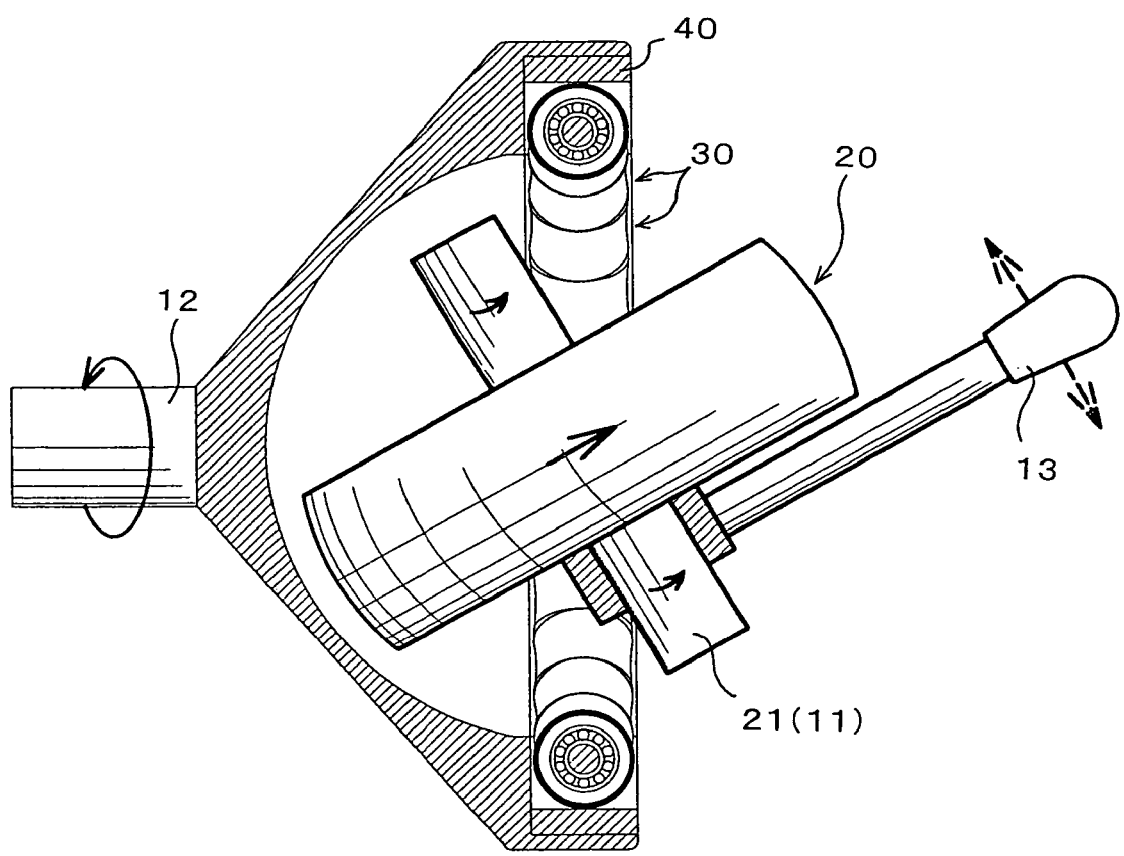
FIG. 2 is a longitudinal section thereof.
Figure 3:
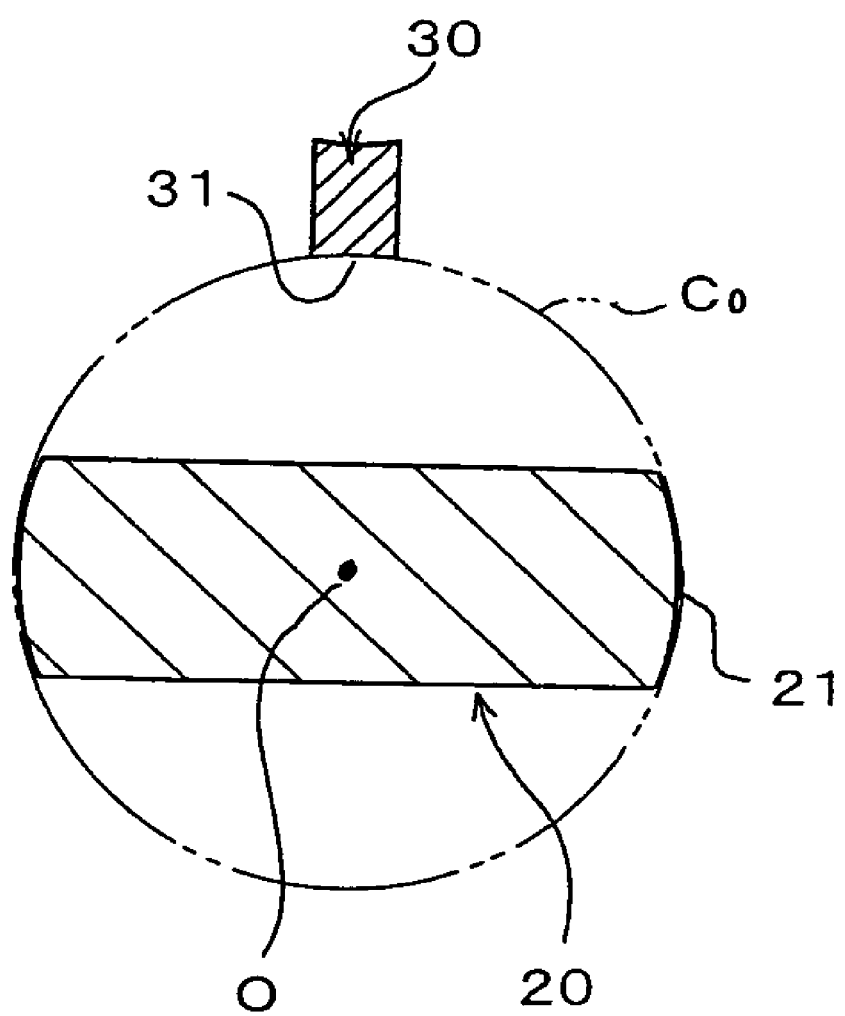
FIG. 3 is a sectional view showing the shape of the end face of the roll surface 21 of the power roller 20 and the roll surface 31 of the counter roller 30 centered on a sphere O.
Figure 4:
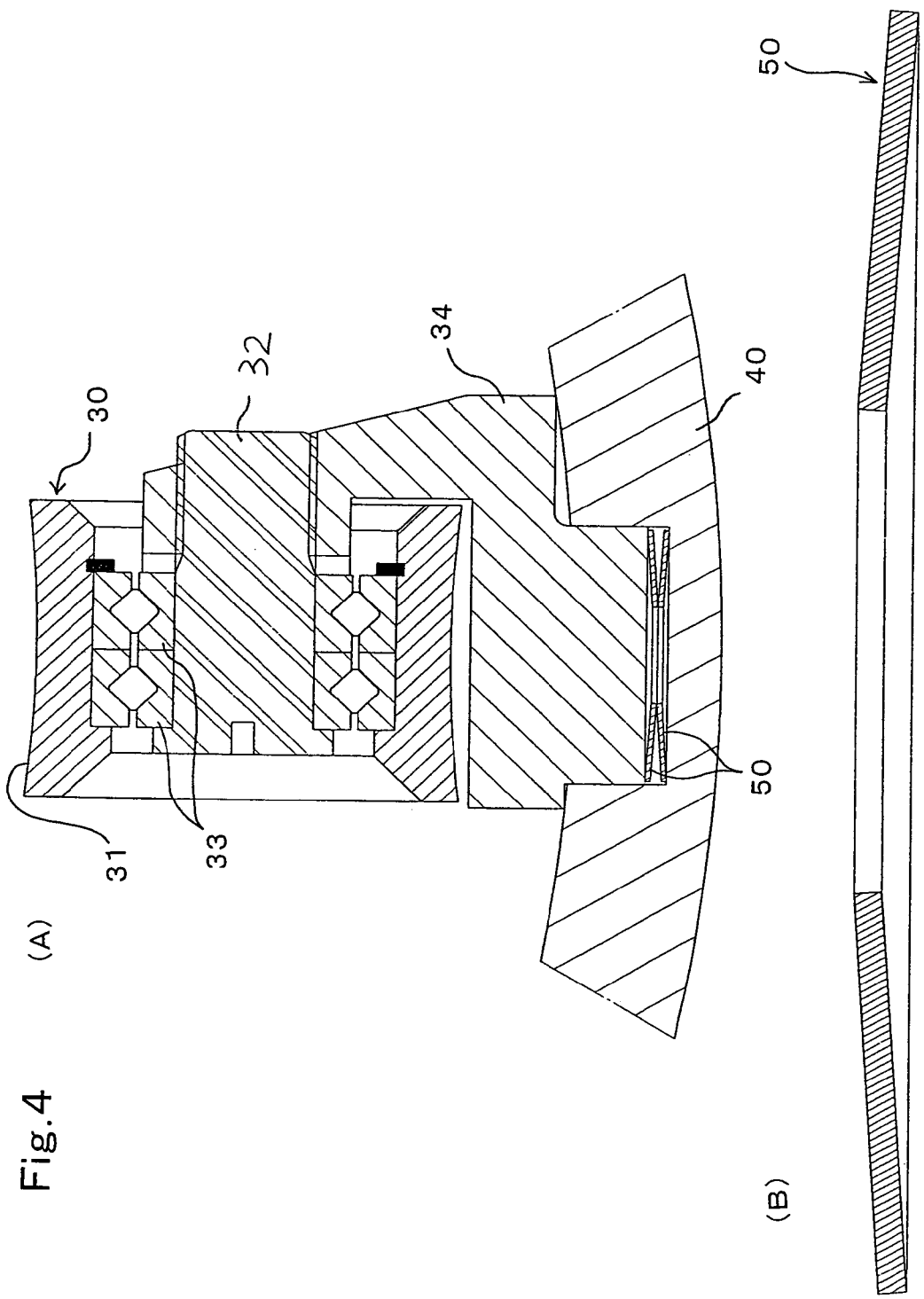
FIG. 4 is an enlarged view (A) of a portion marked with line 1—1 in FIG. 1, and an enlarged sectional view (B) of a leaf spring 50 used therein.
Figure 5:
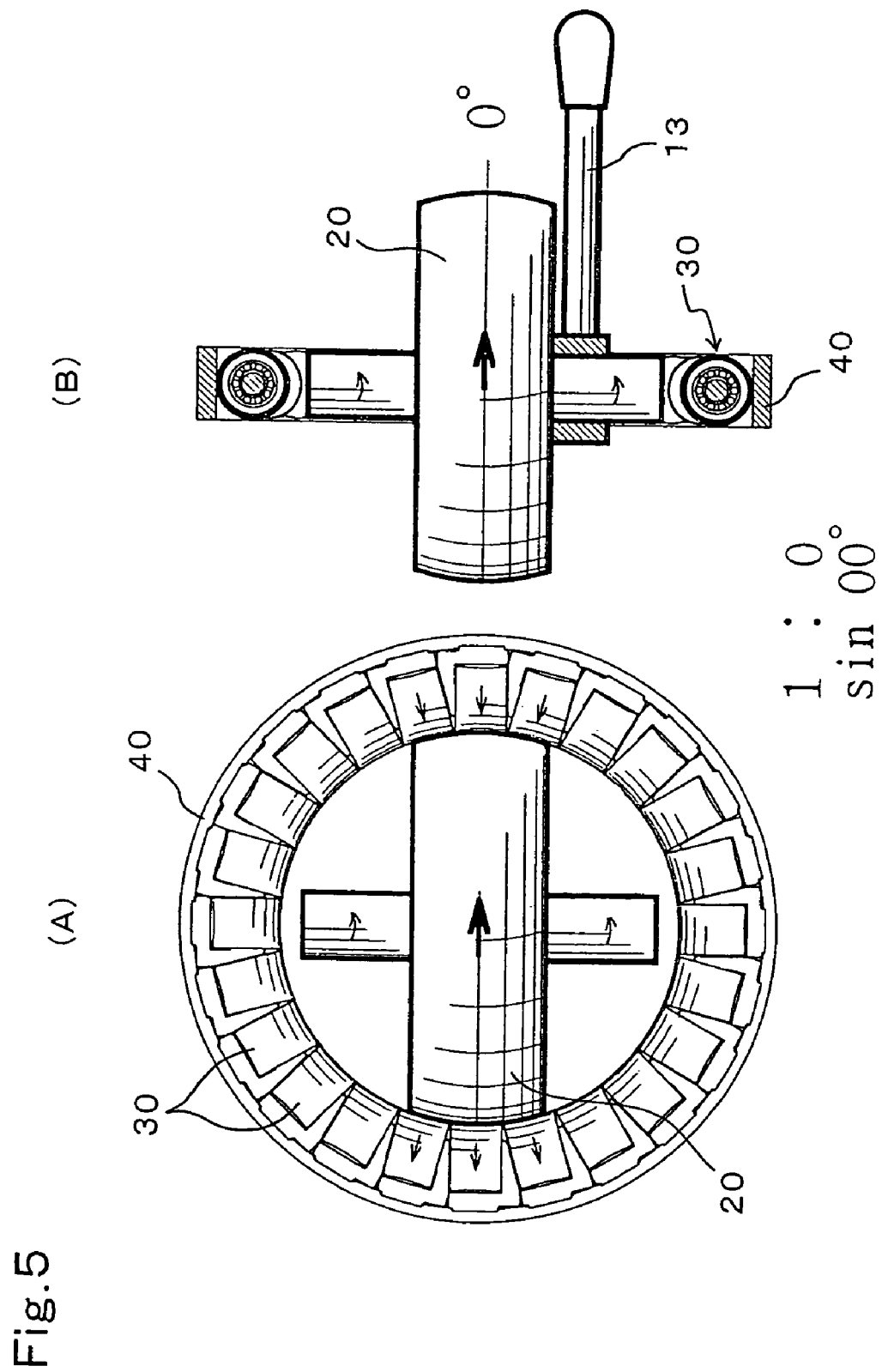
FIGS. 5–8 are a transverse sectional plan view (A) and a longitudinal front elevation (B), showing a power roller 20 and its relation to a disk 40, respectively; shows the case where the power roller 20 is positioned perpendicular to the disk 40; 6 shows the case where the power roller 20 is inclined at an angle of 30°.
Figure 6:
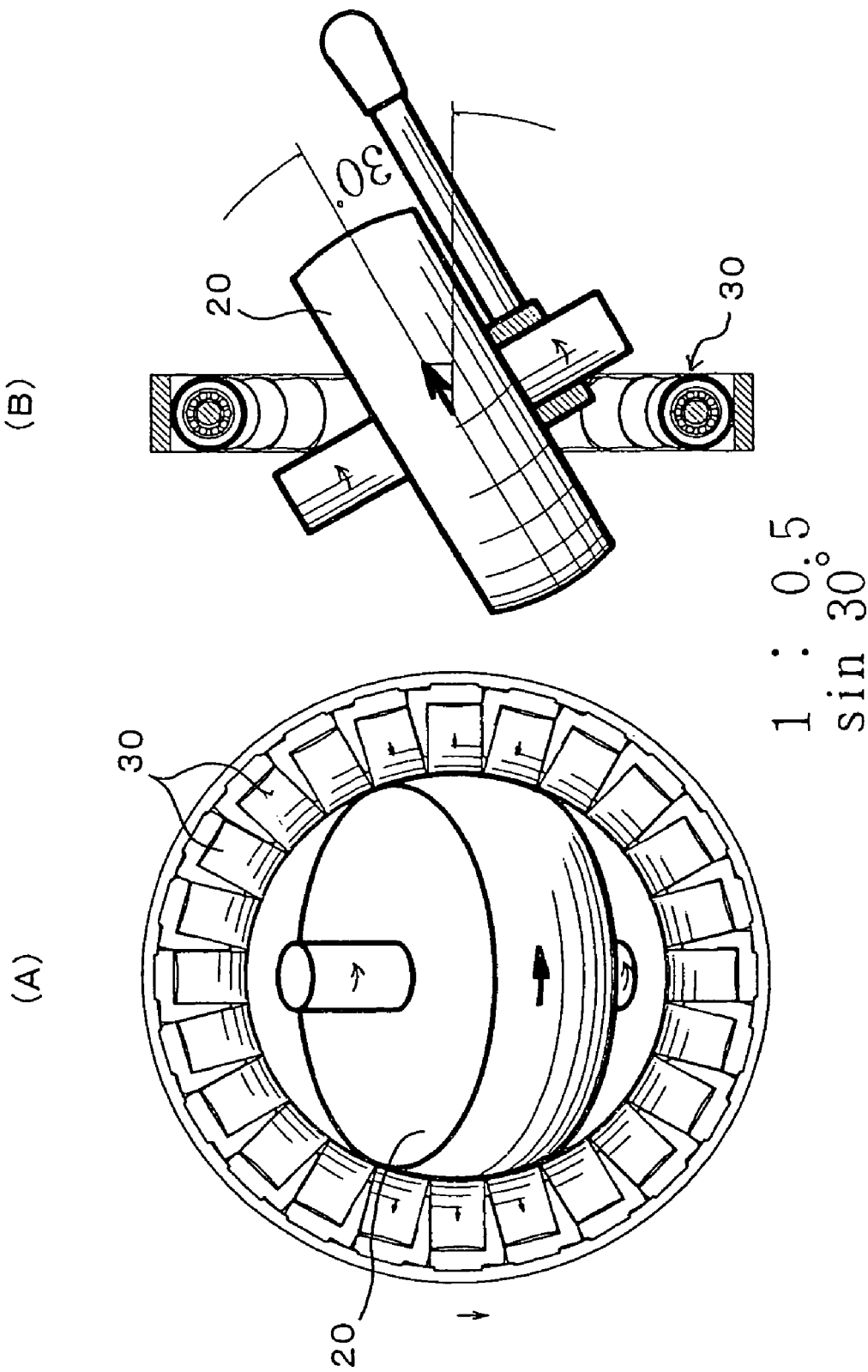
Figure 7:
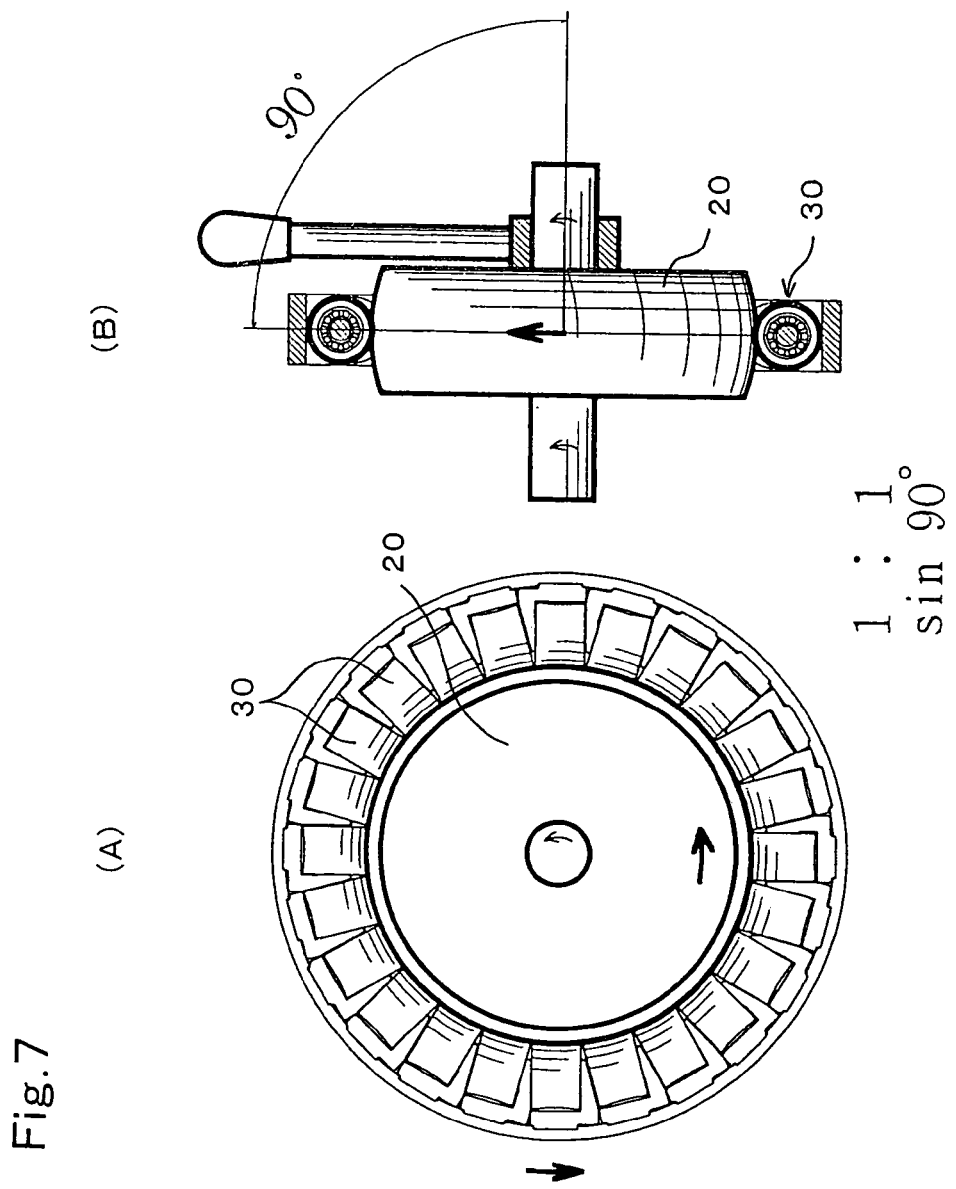
Figure 8:
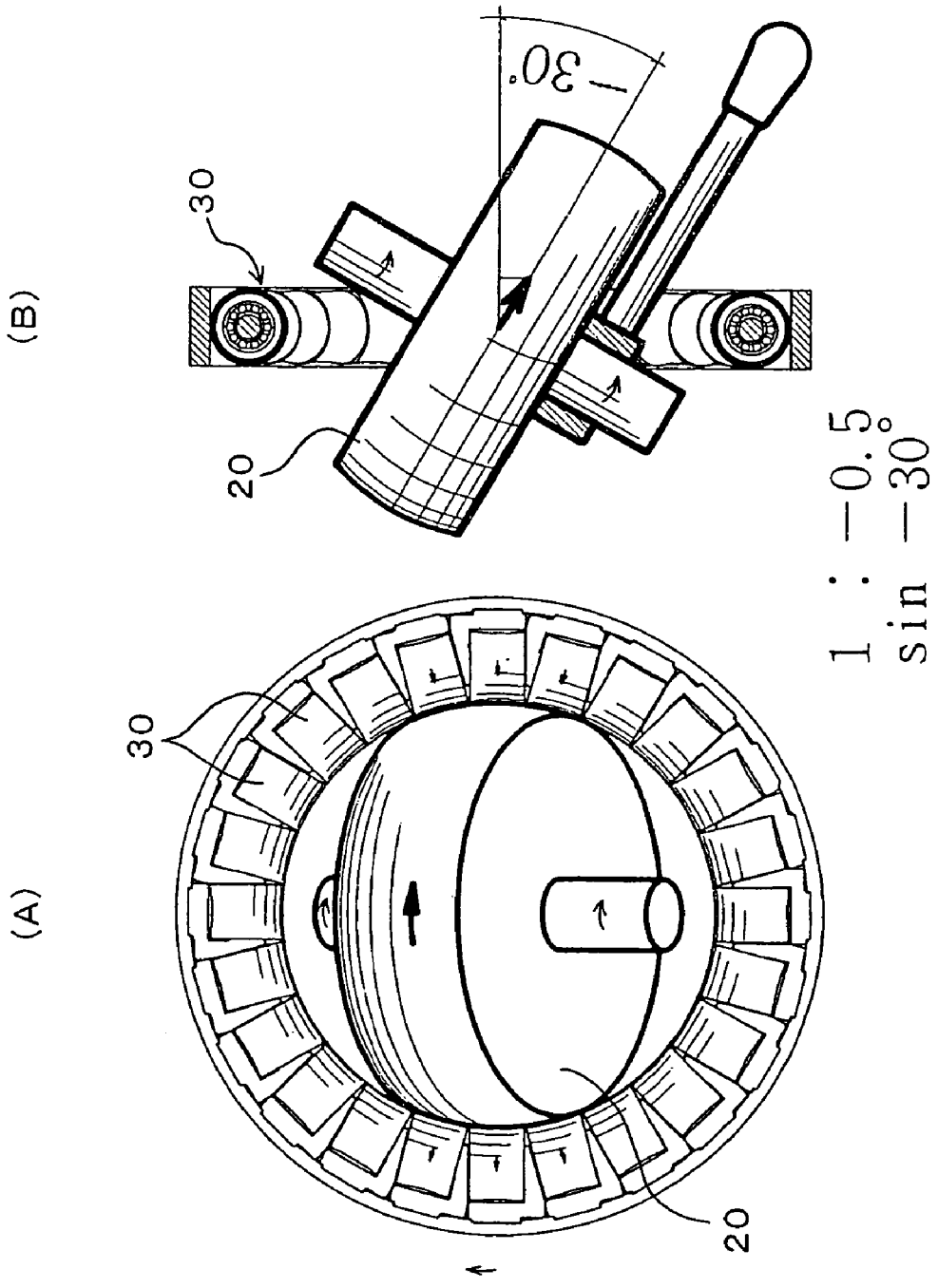
Figure 12:
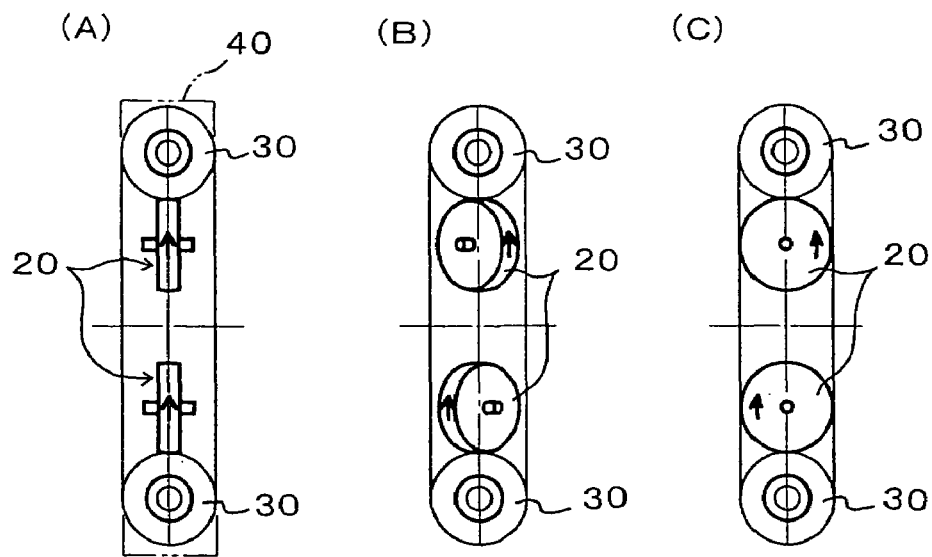
FIGS. 12–15 show examples of cases in which a plurality of power rollers 20 are used and are inclined in the order of (A)–(C), respectively.
Figure 13:
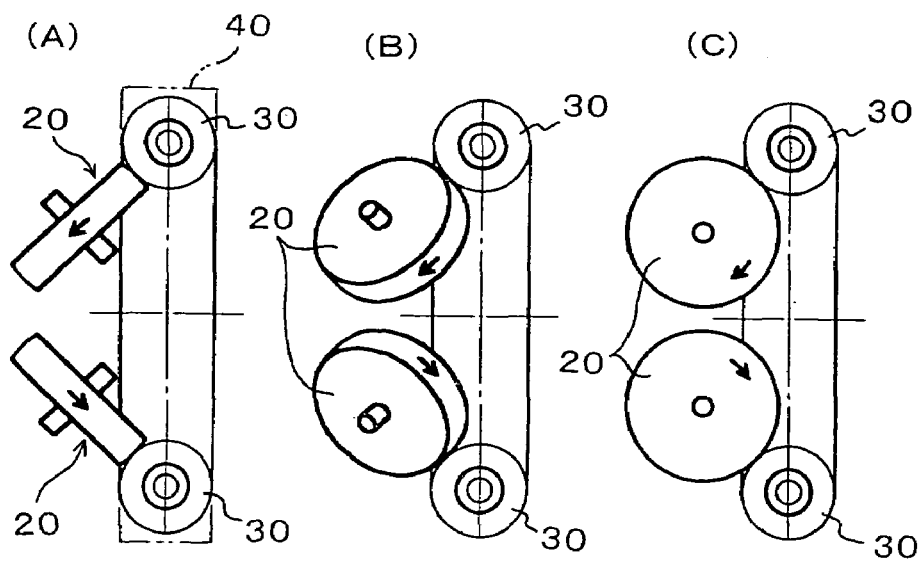
Figure 14:
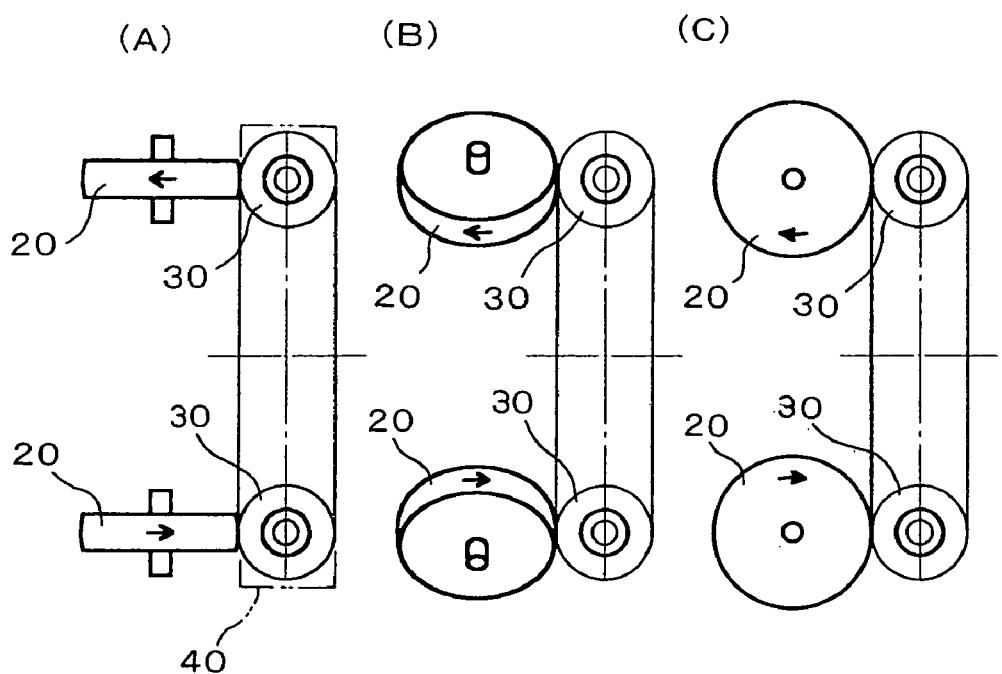
Figure 15:
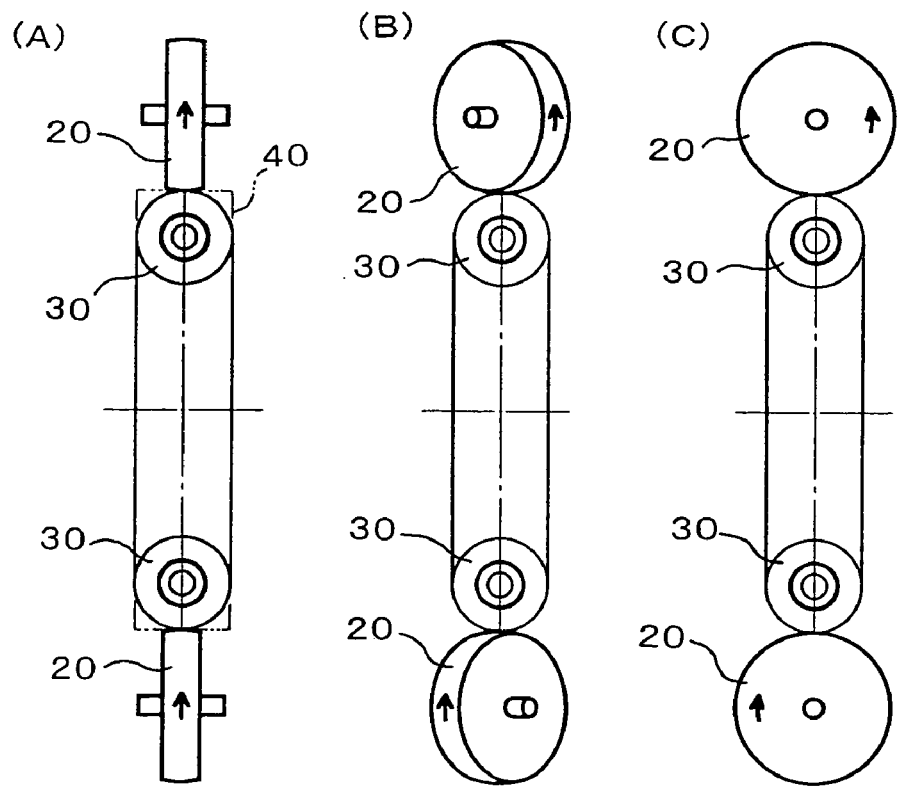
Figure 16:
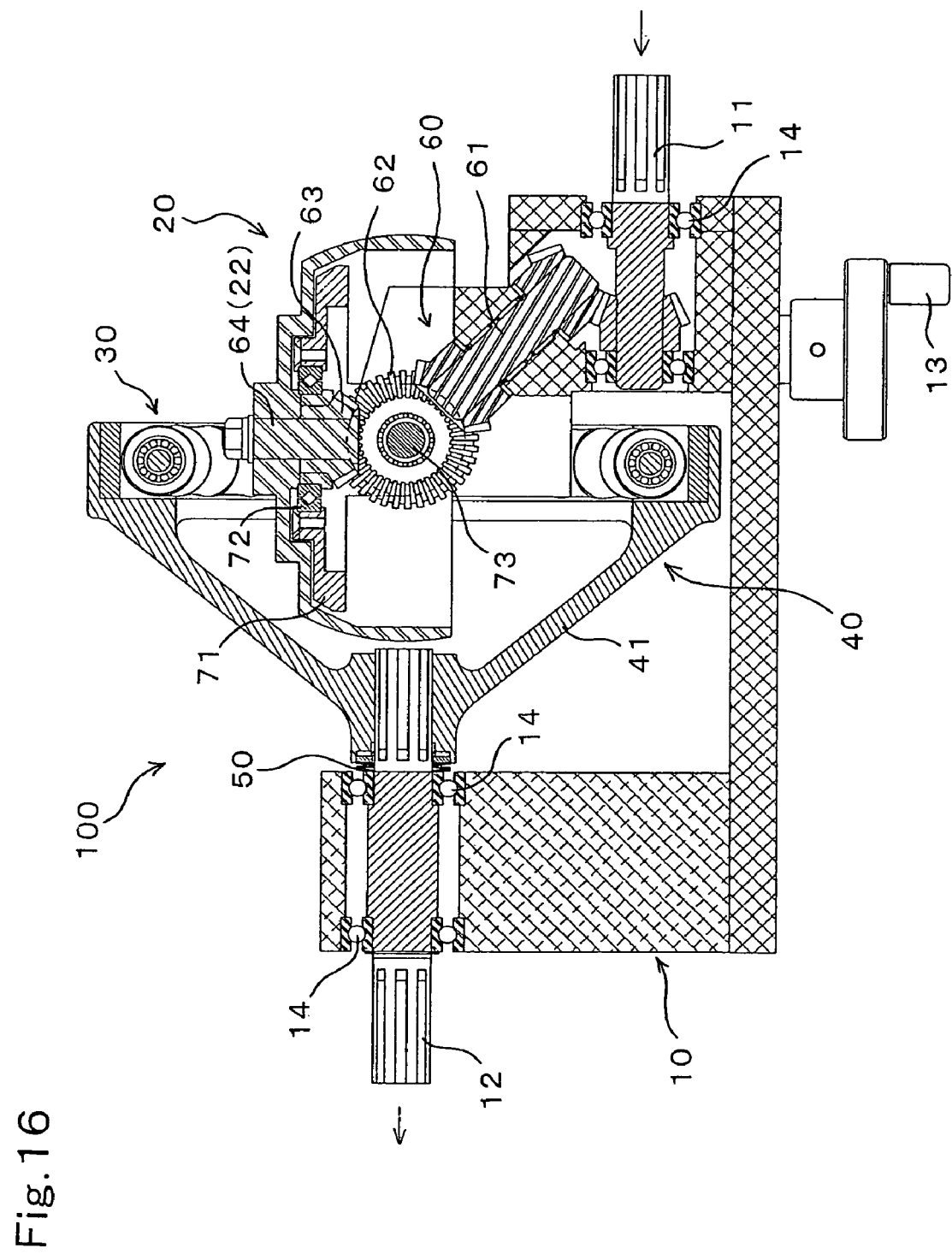
FIGS. 16–21 show a mechanical continuously variable transmission 100 according to a first embodiment of the present invention, respectively.

FIG. 16 is a transverse sectional view showing a mechanical continuously variable transmission 100 according to the present invention. The mechanical continuously variable transmission 100 is arranged to transmit the turning force received by an input axle 11, which protrudes rightward from a casing 10 shown in FIG. 16, to an output axle 12, which protrudes leftward from the casing 10 shown in FIG. 16 while shifting in a continuously variable manner. Most component members thereof are incorporated into one casing 10. The mechanical continuously variable transmission 100 according to the first embodiment is a type in which one power roller 20 is fitted into a torus formed by a plurality of counter rollers 30 incorporated in the disk 40, which is equivalent to the above-described mechanical continuously variable transmission 100 shown in FIGS. 1 and 2.

As shown in FIG. 16, with respect to the casing 10, a semispherical power roller 20 is assembled so as to be rotated around a rotation axle 22 thereof and to be inclined around a turning axle 73 which will be described later. The rotation of the power roller 20 by the turning force from the input axle 11 is made by a turning force transmission mechanism 60 shown in FIG. 16; the inclination movement of the rotation axle 22 is made by an inclination mechanism 70 that transmits the operation of a gearshift lever or handle 13.

Of course, a roll surface 21 of the power roller 20 has the same shape as that of the partial surface of a sphere. The larger diameter side of the power roller 20 is largely opened so that, as shown in FIG. 16, parts of the turning force transmission mechanism 60 and the inclination mechanism 70 can be incorporated therein. Also, a cavity is formed within the power roller 20 and a base 71 constituting the inclination mechanism 70 is incorporated therein.

Figure 19:
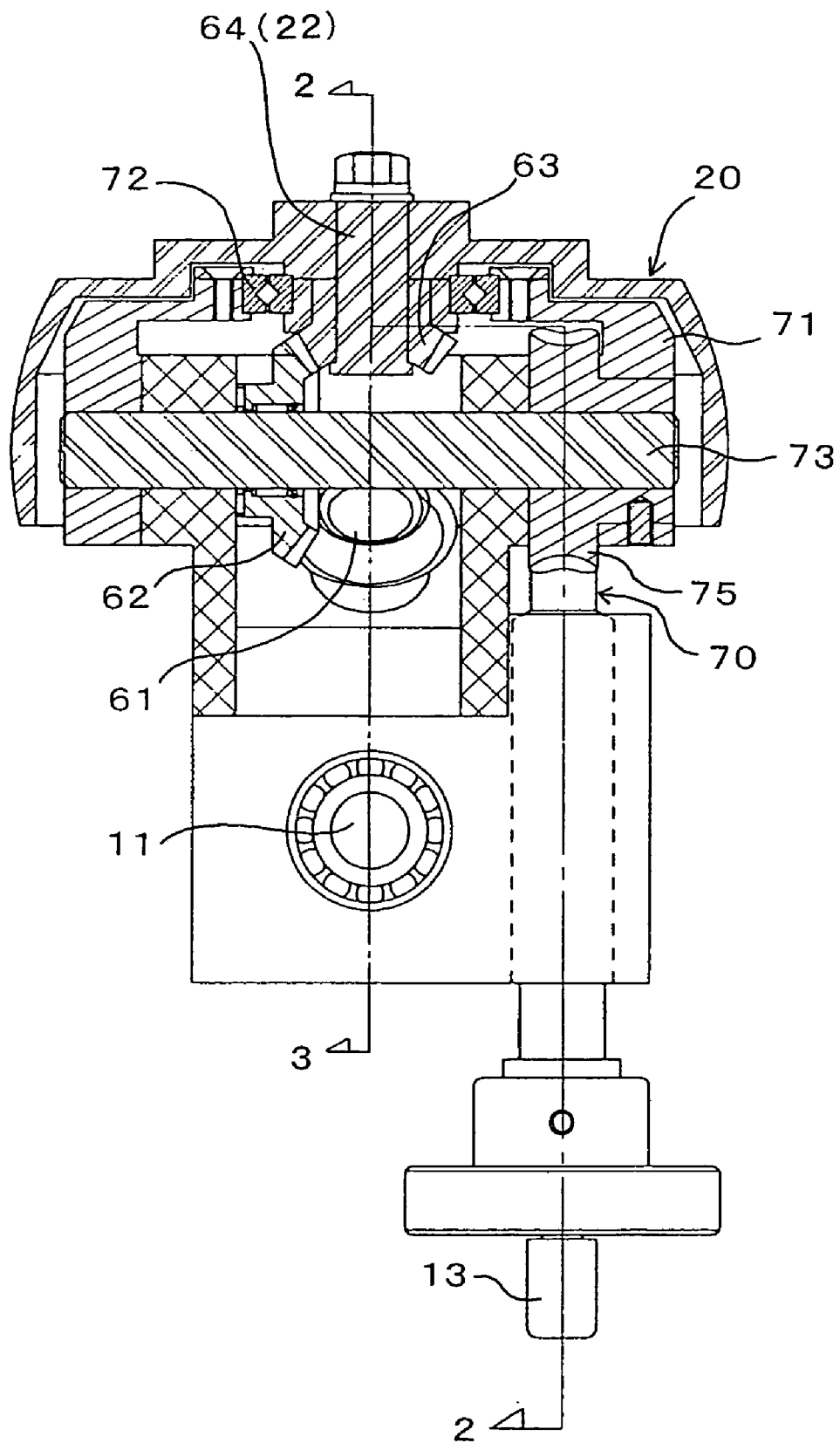
Figure 20:
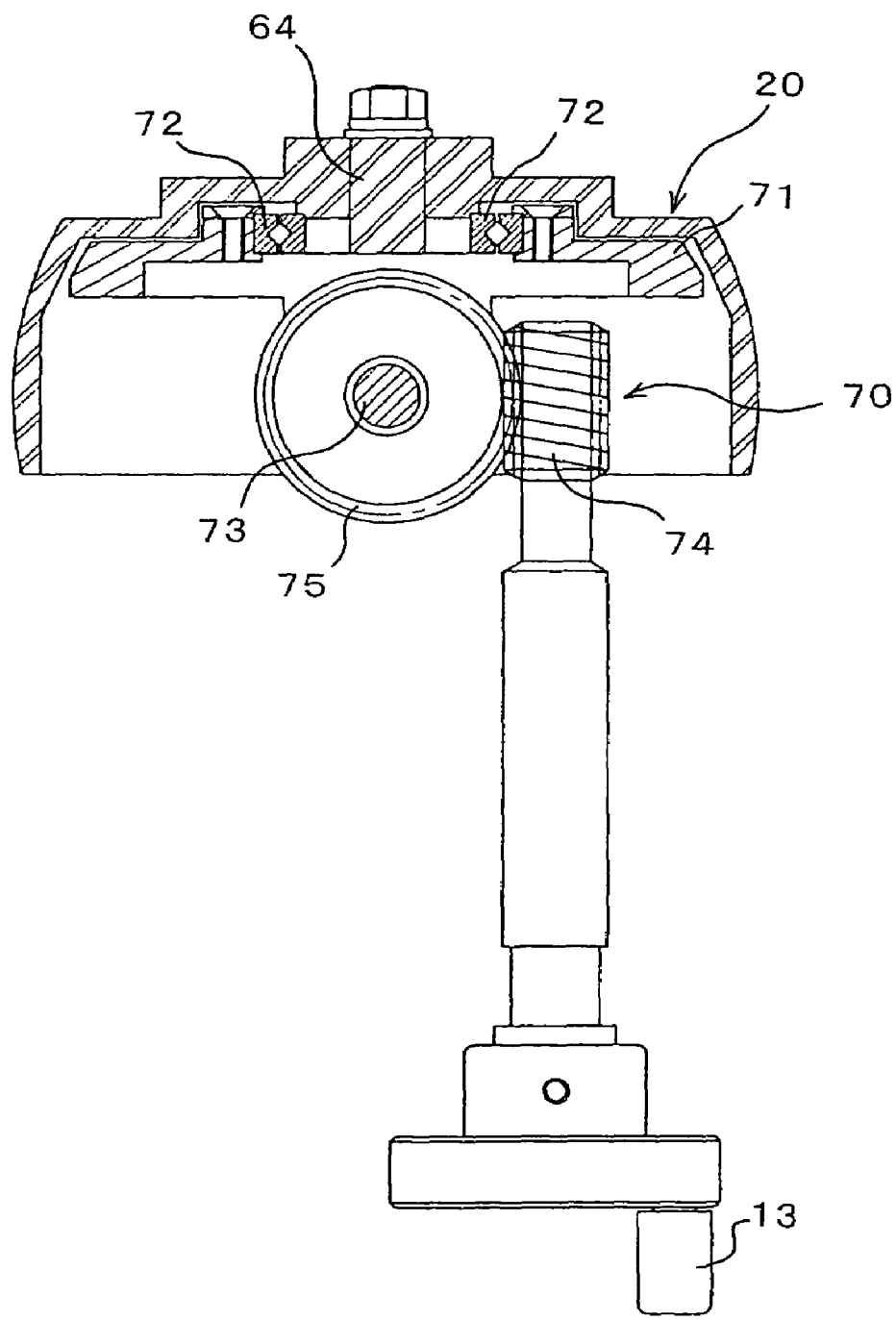

As shown in FIGS. 19 and 20, the turning force transmission mechanism 60 for rotating the power roller 20 comprises an intermediate axle 61 to which the turning force from the input axle 11 is transmitted through a depicted bevel gear, a free bevel gear 62 that transmits the turning force from the intermediate axle 61 to a fixed bevel gear 63 on the power roller 20 side avoiding the turning axle 73 on the inclination mechanism side, and a center axle 64 that fixedly connects the fixed bevel gear 63 with the power roller 20. Of course, the intermediate axle 61 is provided with a bevel gear that meshes with a bevel gear fixed on the input axle 11 side and a bevel gear that meshes with the free bevel gear 62, respectively, at both ends thereof, and in order to avoid interfering the movement of the disk 40 and the turning axle 73, as shown in FIG. 16, inclined at a predetermined angle with respect to the axial direction of the input axle 11 as shown in FIG. 16.

According to the above-described turning force transmission mechanism 60, as shown in FIGS. 16–21, first of all, the turning force from the input axle 11 is transmitted to the intermediate axle 61 through the bevel gears and the rotation of the intermediate axle 61 is transmitted to the free bevel gear 62 through the bevel gear. The key point here is that it is arranged so that the turning axle 73 for performing the inclination movement of the power roller 20 is located at the center thereof so as to allow the free bevel gear 62 to turn freely around the turning axle 73. Owing to this arrangement, irrespective of the inclination movement of the power roller 20 by the operation of the gearshift lever or handle 13 which will be described later, the turning force of the input axle 11 side can be transmitted to the fixed bevel gear 63 on the power roller 20 side.

To the free bevel gear 62 which is freely rotatable on the turning axle 73, the center axle 64 is connected via the fixed bevel gear 63, and these center axle 64 and free bevel gear 62 are adapted so as to rotate freely with respect to the base 71 on the inclination mechanism 70 side through a bearing 72.

As a result, as shown in FIG. 19, the power roller 20 is rotated by the turning force from the input axle 11 being completely independent from the inclination operation by the inclination mechanism 70 which will be described later. Even when the power roller 20 is inclined to a position as shown in FIGS. 22–25, the power roller 20 is stably driven to rotate by the input axle 11.

Figure 21:
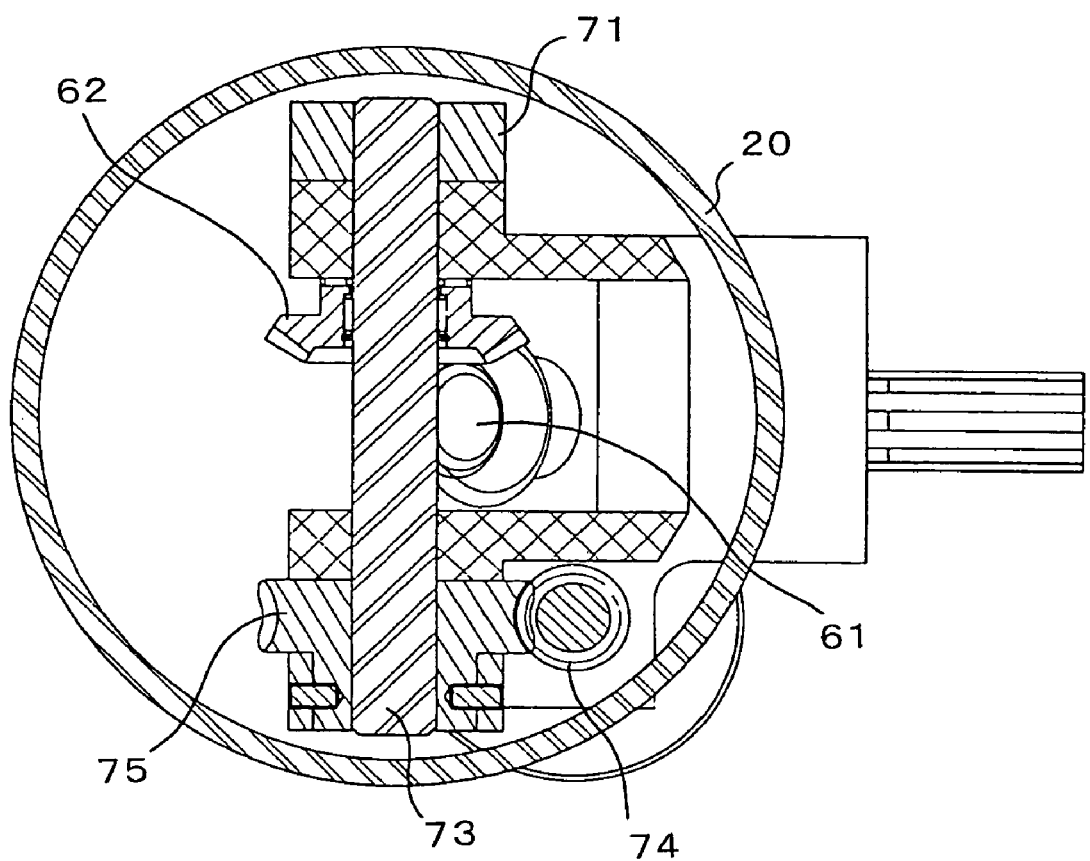
Figure 22:
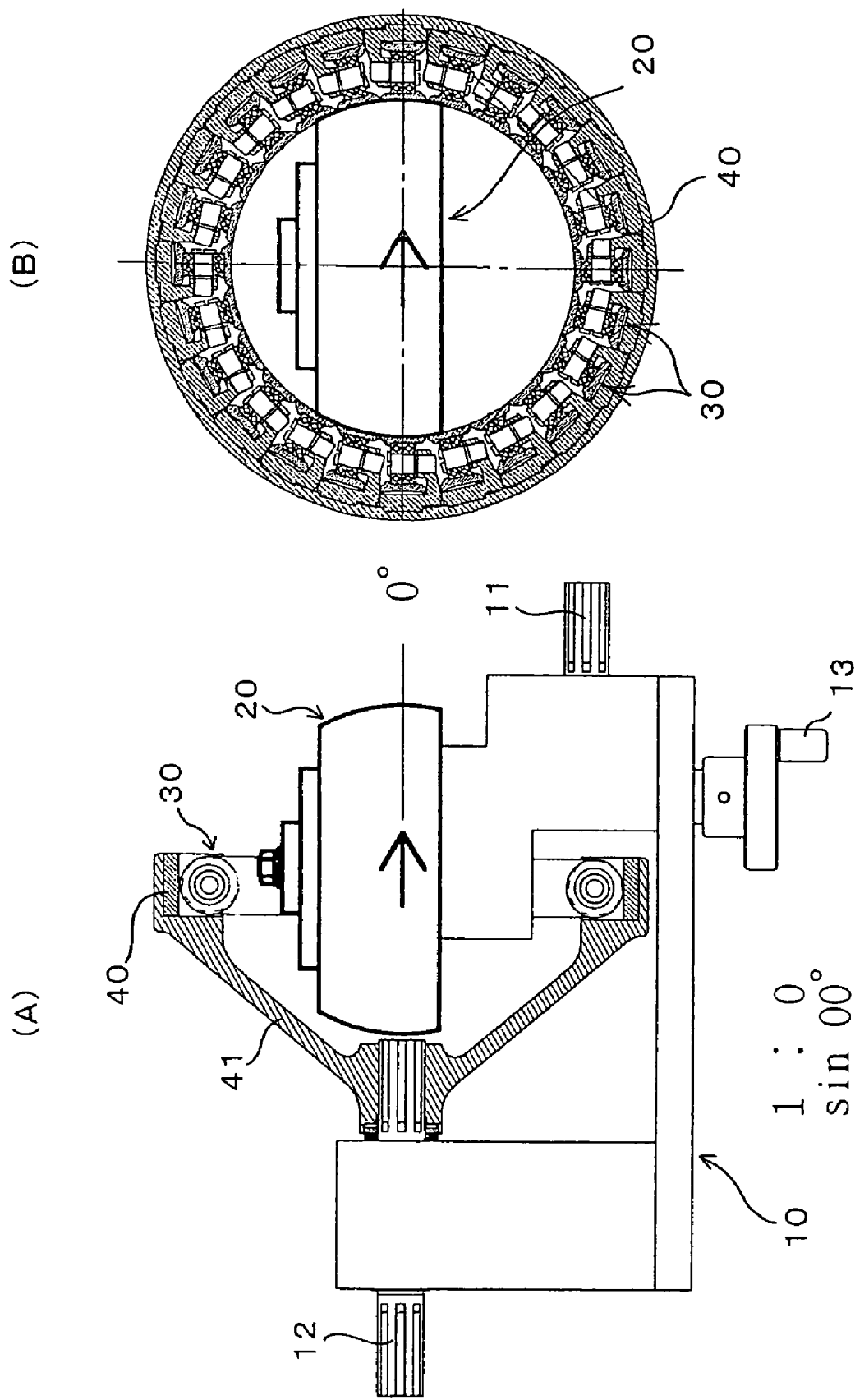
Figure 24:
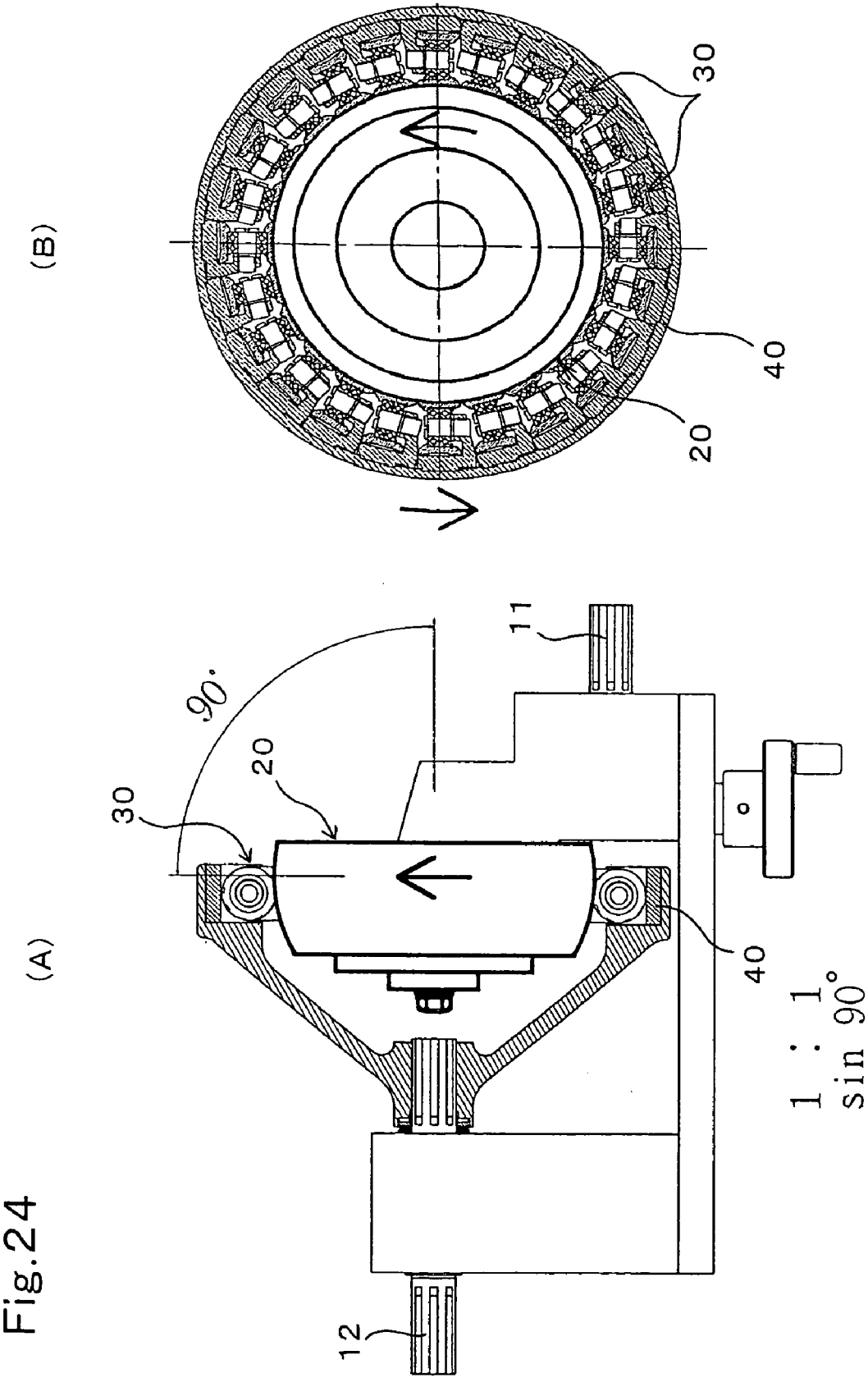
Figure 25:
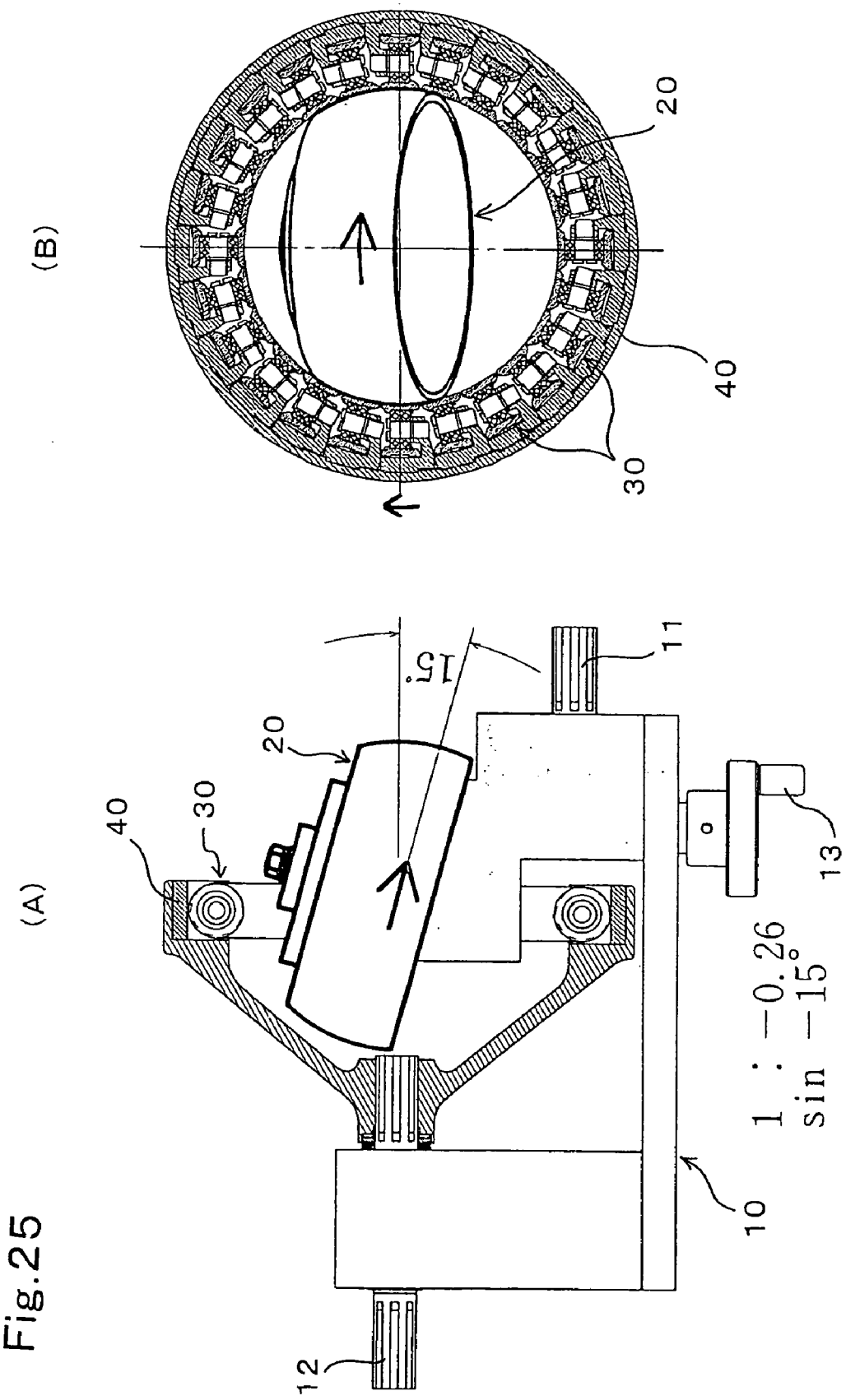

Next, the inclination mechanism 70 for performing the inclination movement operation of the power roller 20 will be described. The inclination mechanism 70 comprises, as shown in FIGS. 16–21, the base 71 that is received within the power roller 20 via the bearing 72, the turning axle 73 which is bridged on the base 71 as shown in FIGS. 19 and 21 and goes through the center of the free bevel gear 62 constituting the above-described turning force transmission mechanism 60, a worm 74 fixedly attached to one end of the turning axle 73, and a worm wheel 75 which meshes with the worm 74 and is provided at the inner side end of the gearshift lever or handle 13 that protrudes out of the casing 10 as shown in FIG. 20.

According to the above-described inclination mechanism 70, as shown in FIG. 20, the worm 74 is rotated by turning adjustment of the gearshift lever or handle 13, and is meshed with the worm wheel 75, which is in turn rotated corresponding to the amount and direction of the rotation of the worm 74. The key point here is that the worm 74 is provided on the gearshift lever or handle 13 side and the worm wheel 75 is provided on the turning axle 73 side. The reason of this is as follows: when the mechanical continuously variable transmission 100 is activated, the turning axle 73 side is subjected to a reaction force. However, by arranging as described above, it is possible to prevent the gearshift lever or handle 13 side from being subjected to the reaction force and stable turning adjustment of the gearshift lever or handle 13 can be performed.

As shown in FIG. 19, because the worm wheel 75, which is turned corresponding to the turning adjustment of the gearshift lever or handle 13, is integrated with the turning axle 73 bridged on the base 71, the inclination movement of the base 71 is made around the axis of the turning axle 73, i.e., around the turning axle 73 shown as a section in FIG. 20. Needless to say, the power roller 20, which is inclined by the inclination mechanism 70, is also driven to rotate by the turning force transmission mechanism 60 included in a separate system, which is quite different from the inclination mechanism 70.

State of the inclination movement of the power roller 20 is shown in FIGS. 22–25 representatively. Since the mechanical continuously variable transmission 100 performs continuous shift, it is needless to say that the states shown in FIGS. 22-25 are shifted continuously. In FIGS. 22–25, (A) is a schematic plan view showing the worm wheel 75; and (B) is a longitudinal section side view showing a relationship between the power roller 20 and each counter roller 30 in the respective states.

Figure 17:
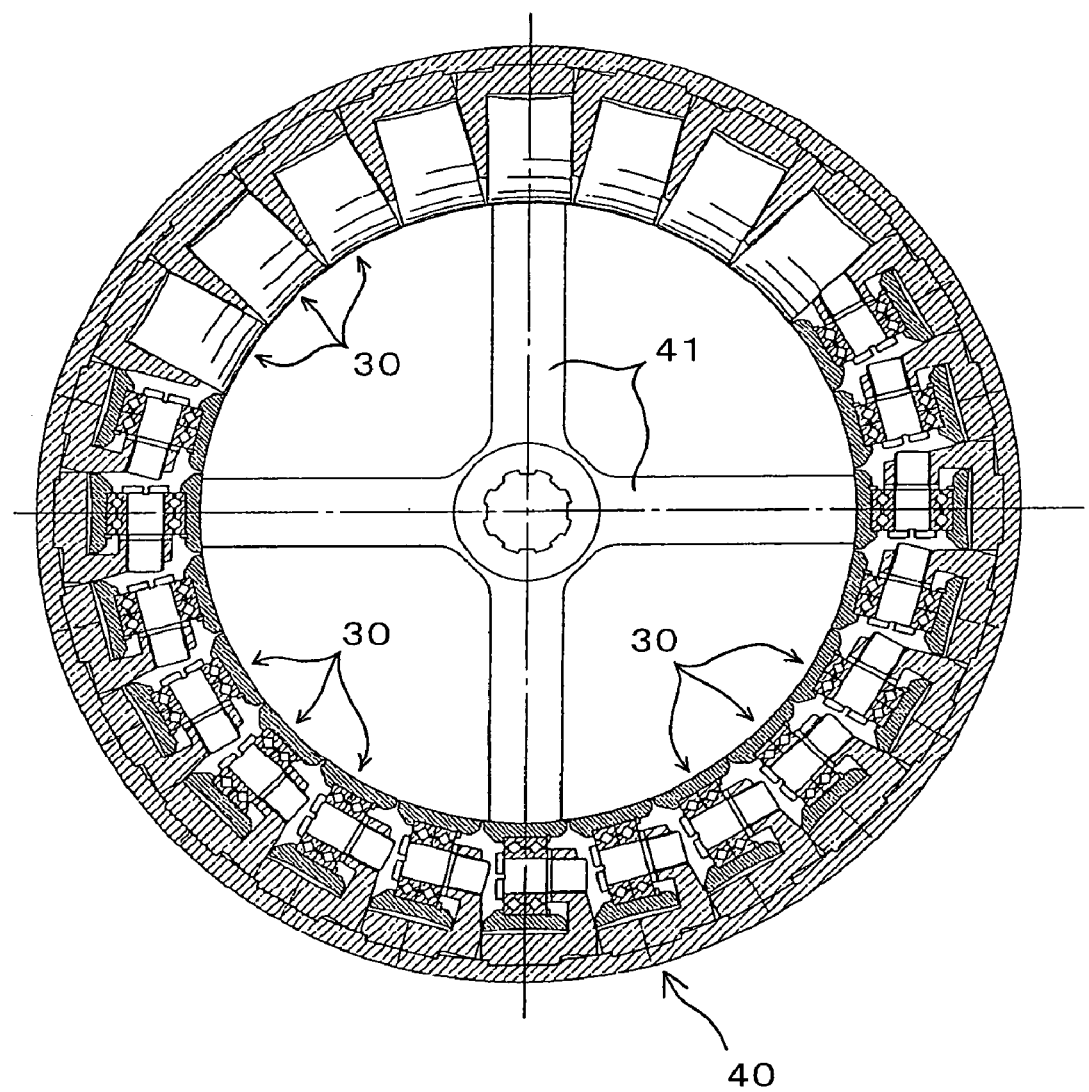
Figure 18:
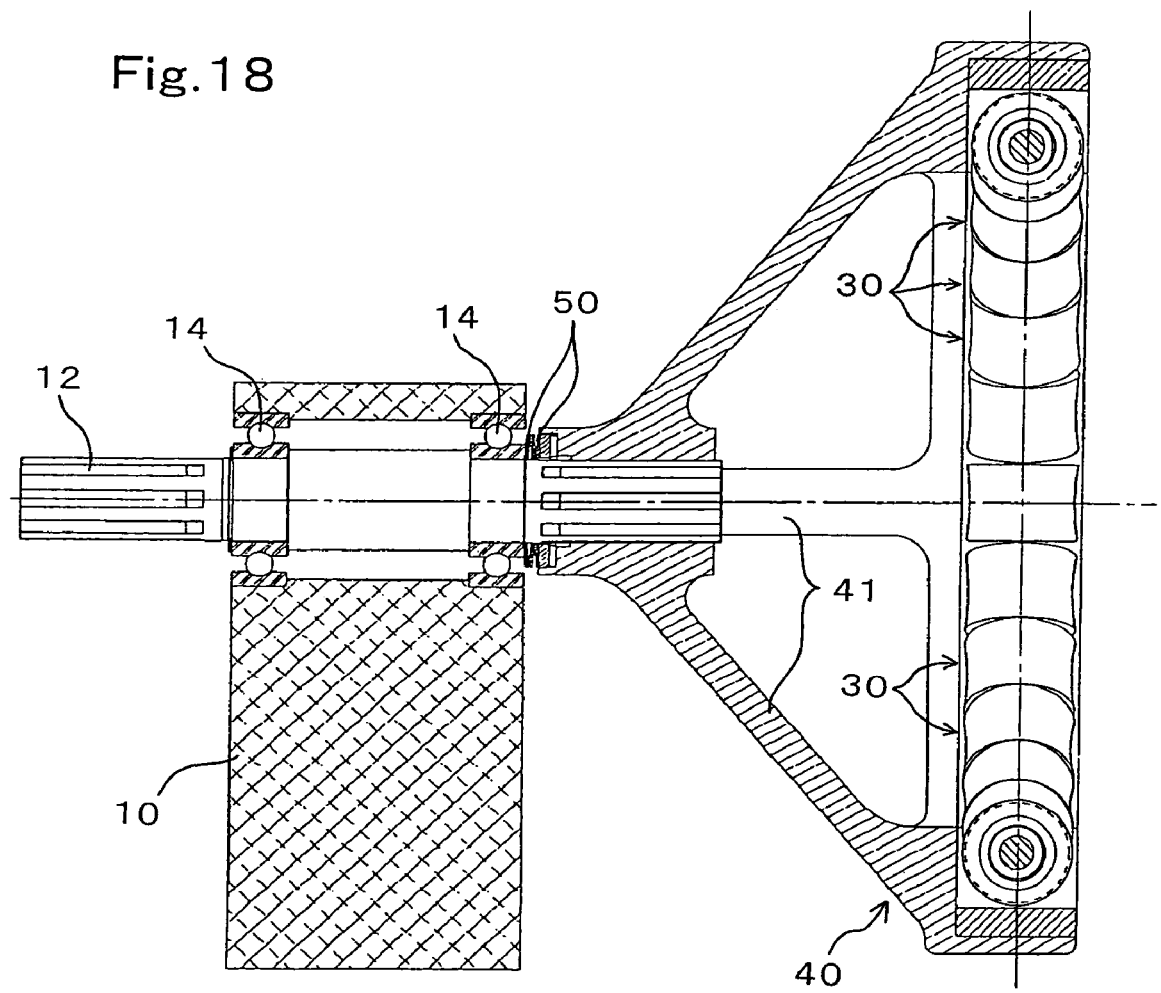

The counter rollers 30, with which the power roller 20 that performs the rotation and the inclination movement as described above comes into contact, will be described. In the mechanical continuously variable transmission 100 according to the present embodiment, a number of counter rollers 30 are adapted to be assembled into one disk 40 into a toric shape as shown in FIGS. 16–18. The roll surface 31 of each counter roller 30 is formed into a concave shape so as to come into line contact with the outer surface of a sphere as shown in FIGS. 17 and 18. Each end portion of the counter rollers 30 is supported by one disk 40 so as to form a consecutive range. The support of the counter rollers 30 to the disk 40 is made in such state as described in FIG. 1, that the rotation axle 32 is supported by the bearing 33 so as to rotate freely with respect to the disk 40.

The disk 40 is for integrating the reaction force received by each counter roller 30 from the rotation of the power roller 20 and for outputting the same to the output axle 12 side. Accordingly, the disk 40 is spline-connected with the output axle 12 via a plurality of legs 41 as shown in FIG. 16. The reason why the disk 40 is spline-connected to the output axle 12 is as follows: it is arranged so that the disk 40 reliably transmits the turning force to the output axle 12 side, while the disk 40 comes into elastic contact with the power roller 20 owing to the biasing force from leaf springs 50 in the rightward direction in FIG. 16.

Therefore, in the mechanical continuously variable transmission 100 according to the embodiment 1, a plurality of leaf springs 50 are assembled between the legs 41 of the disk 40 and the inner ring of the bearing 14 that rotatably supports the output axle 12 with respect to the casing 10. The leaf springs 50 function so as to elastically press the disk 40 assembled with the number of counter rollers 30 against the power roller 20 supported by the casing 10.

Second Embodiment

FIGS. 26–31 show a mechanical continuously variable transmission 100 according to a second embodiment of the present invention. The general structure of the mechanical continuously variable transmission 100 is similar to that shown in FIG. 11 (B). However, in the mechanical continuously variable transmission 100 according to the second embodiment, it is arranged so that the transmission of turning force from the input axle 11 and the inclination movement of the power roller 20 by the gearshift lever or handle 13 are made by each member incorporated within the power roller 20 and thereby the size and number of components of the entire transmission can be decreased.

Figure 26:
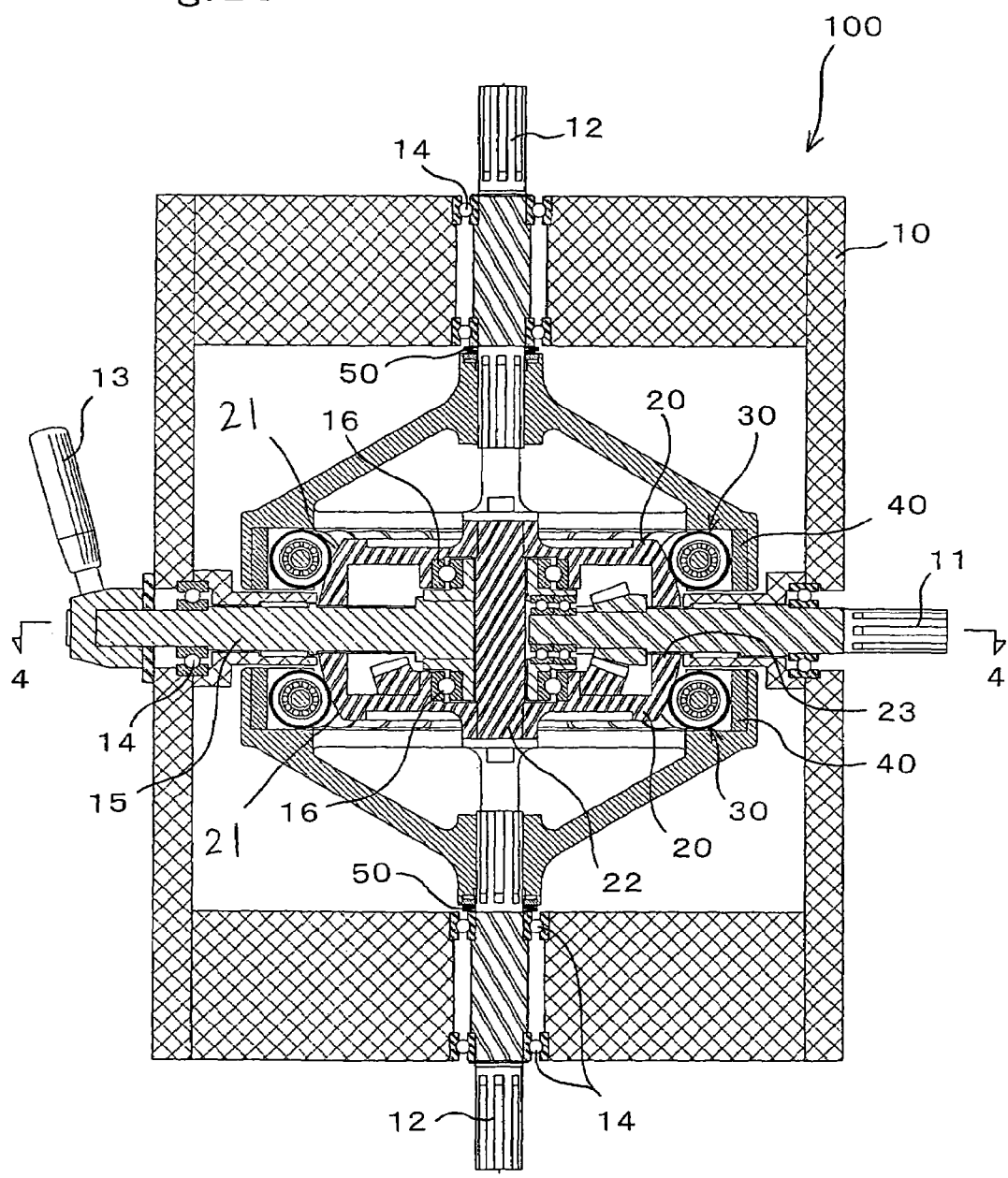
FIGS. 26–28 show a mechanical continuously variable transmission 100 according to a second embodiment of the present invention.
Figure 27:
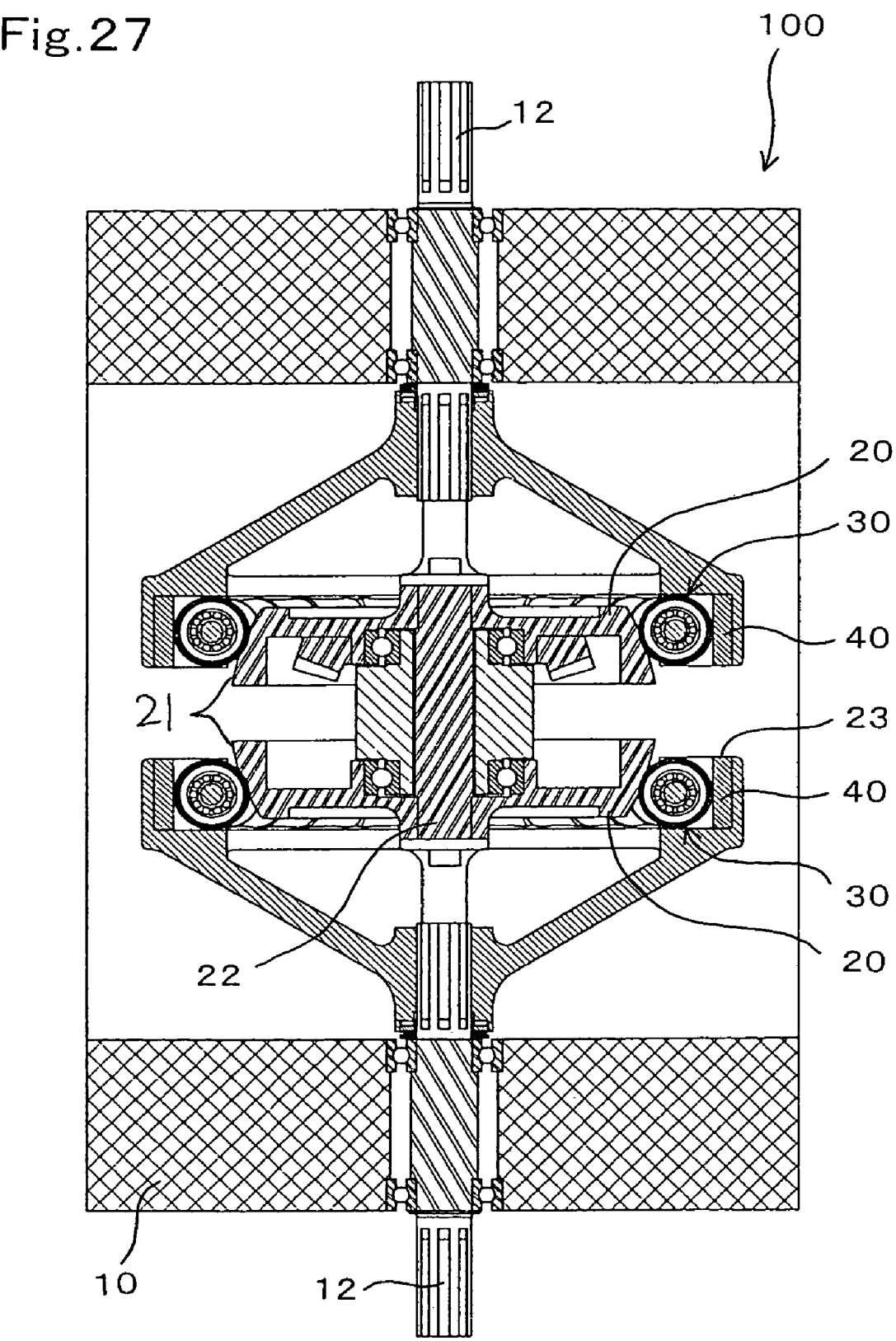

That is, in the mechanical continuously variable transmission 100 according to the second embodiment, as shown in FIGS. 26 and 27, the power roller 20 comprises two members having the same configuration in which the roll surface 21 is in a partial configuration of a sphere respectively, and the two power rollers 20 are integrally connected by a rotation axle 22, which serves as the center thereof. Owing to this arrangement, the power roller 20 has such configuration that roughly upper and lower quarters of a sphere are cut off, and in a portion which goes through the center of the sphere, an opening 23 shown in FIG. 27 is formed all along the periphery thereof. Within the opening 23, as shown in FIG. 26, an input axle 11 from the right in the figure is inserted; and from the left in the figure, an inclination axle 15, which is rotated by a gearshift lever or handle 13, is inserted.

Since the inner end of the input axle 11 inserted into the power roller 20 engages the inner surface of the power roller 20 via bevel gears, the turning force of the input axle 11 causes the entire of the power roller 20 to rotate around the rotation axle 22. That is, the power roller 20 is rotated by the input axle 11 around the rotation axle 22 shown in FIG. 26 taken as the rotational axle in the right/left direction in the figure. Needless to say, since the opening 23, which allows the input axle 11 to go through, is formed in the power roller 20 all along the periphery thereof as shown in FIG. 27, the power roller 20 rotates without interfering with the input axle 11 or the inclination axle 15, which will be described later.

On the other hand, the inner end of the inclination axle 15, which is inserted within the power roller 20 from the side opposite the input axle 11, is connected to a sleeve 16, which is fitted to the outer periphery of the rotation axle 22 of the power roller 20. The sleeve 16 is incorporated within the power roller 20 through various bearings, and is arranged so as to rotate freely with respect to the rotation axle 22 on the power roller 20 side. In other words, even when the power roller 20 is rotated by the input axle 11, the sleeve 16 does not rotate. As a result, the inner end of the inclination axle 15 can be secured.

Figure 29:
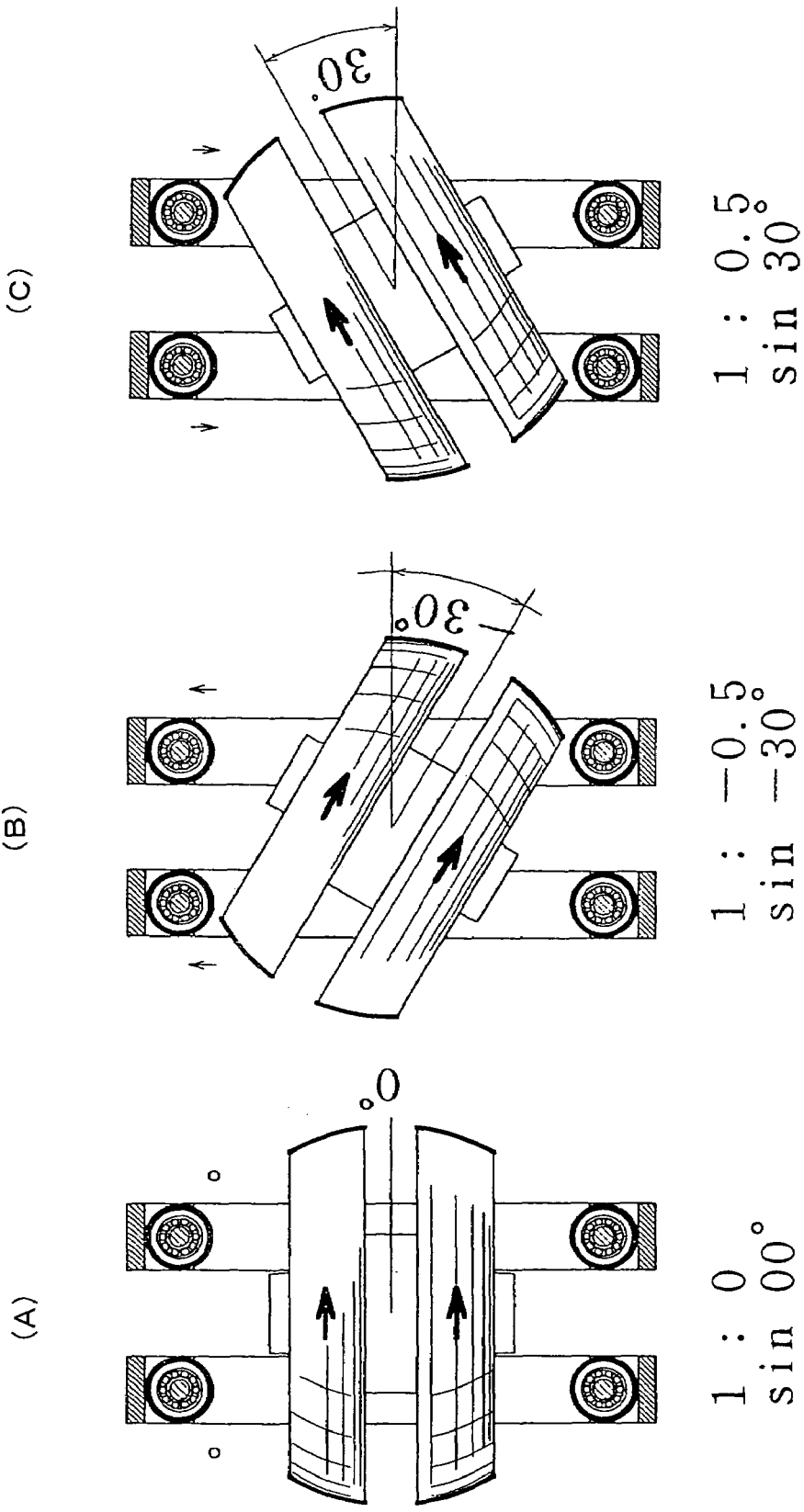
FIG. 29 shows the power roller 20 and its relation to the disk 40 of the mechanical continuously variable transmission 100 according to the above second embodiment; (A) shows the case where the power roller 20 is positioned perpendicular to the disk 40; (B) shows the case where the power roller 20 is inclined at an angle of −30°; and (C) shows the case where the power roller 20 is inclined at an angle of 30°.
Figure 30:
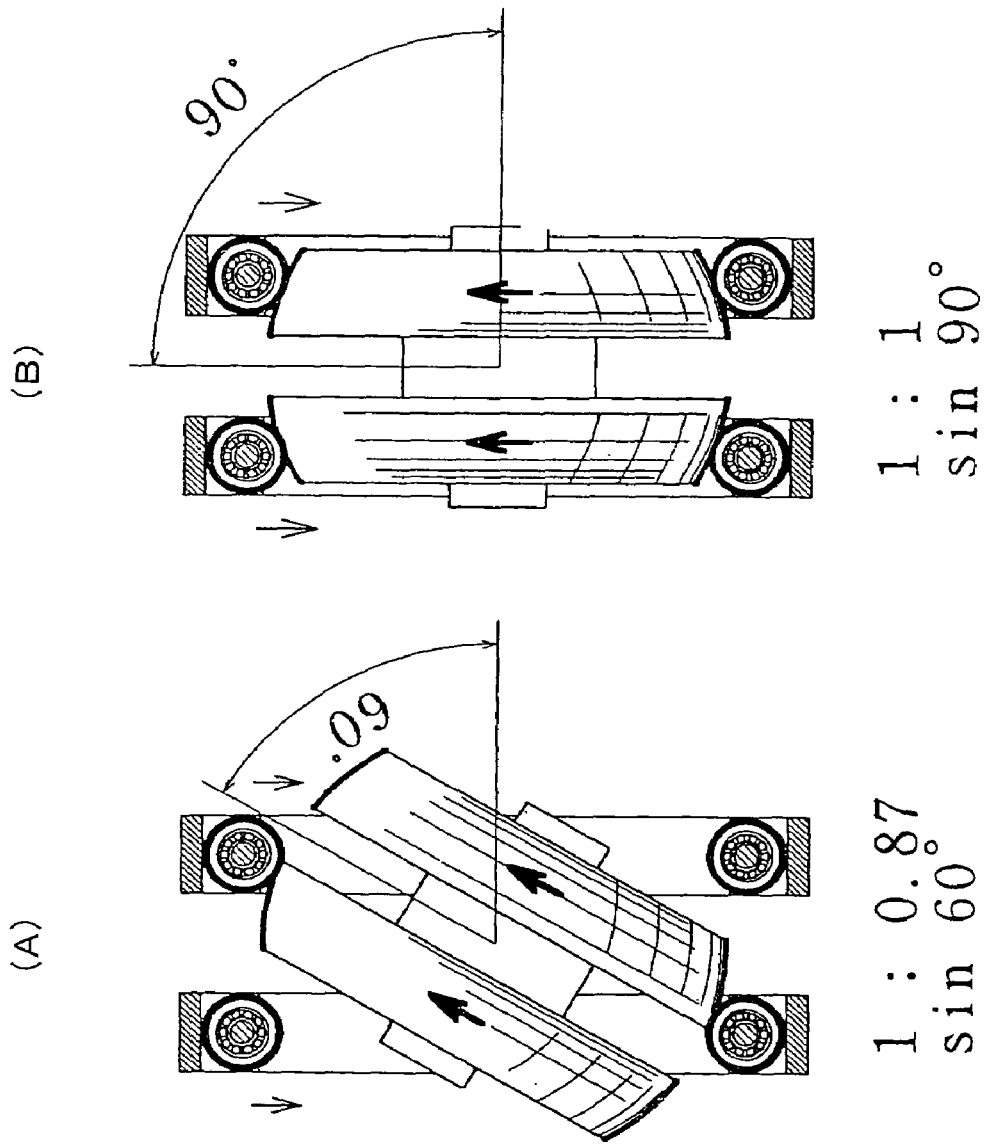
FIG. 30 shows the power roller 20 and its relation to the disk 40 of the mechanical continuously variable transmission 100 according to the above second embodiment; (A) shows the case where the power roller 20 is inclined at an angle of 60°; and (B) shows the case where the power roller 20 is inclined at an angle of 90°.

Because the inner end of the inclination axle 15 is fixedly connected to the sleeve 16, when the gearshift lever or handle 13 is rotated in a predetermined direction, the power roller 20 can be shifted continuously into various inclination states, as shown in FIGS. 29 and 30. Even after shifting, the rotation of the power roller 20 by the input axle 11 is not prevented.

The rotation of the power roller 20 by the input axle 11 and the inclination by the gearshift lever or handle 13 of the power roller 20 are described above. Since the power roller 20 comes into contact with many counter rollers 30 disposed within the casing 10, the turning force of the power roller 20 is shifted corresponding to the inclination state thereof, and transmitted to the disk 40, which supports the counter rollers 30. The disk 40 is connected with the output axles 12 as shown, for example, in FIG. 26. As a result, the rotation of the input axle 11 is shifted and outputted from the output axles 12.

In the second embodiment, as shown in FIG. 26, a plurality of leaf springs 50 are interposed between the casing 10 and the disk 40. Accordingly, owing to the biasing force of these leaf springs 50, the disk 40 is always pressed toward the power roller 20 side.

Figure 28:
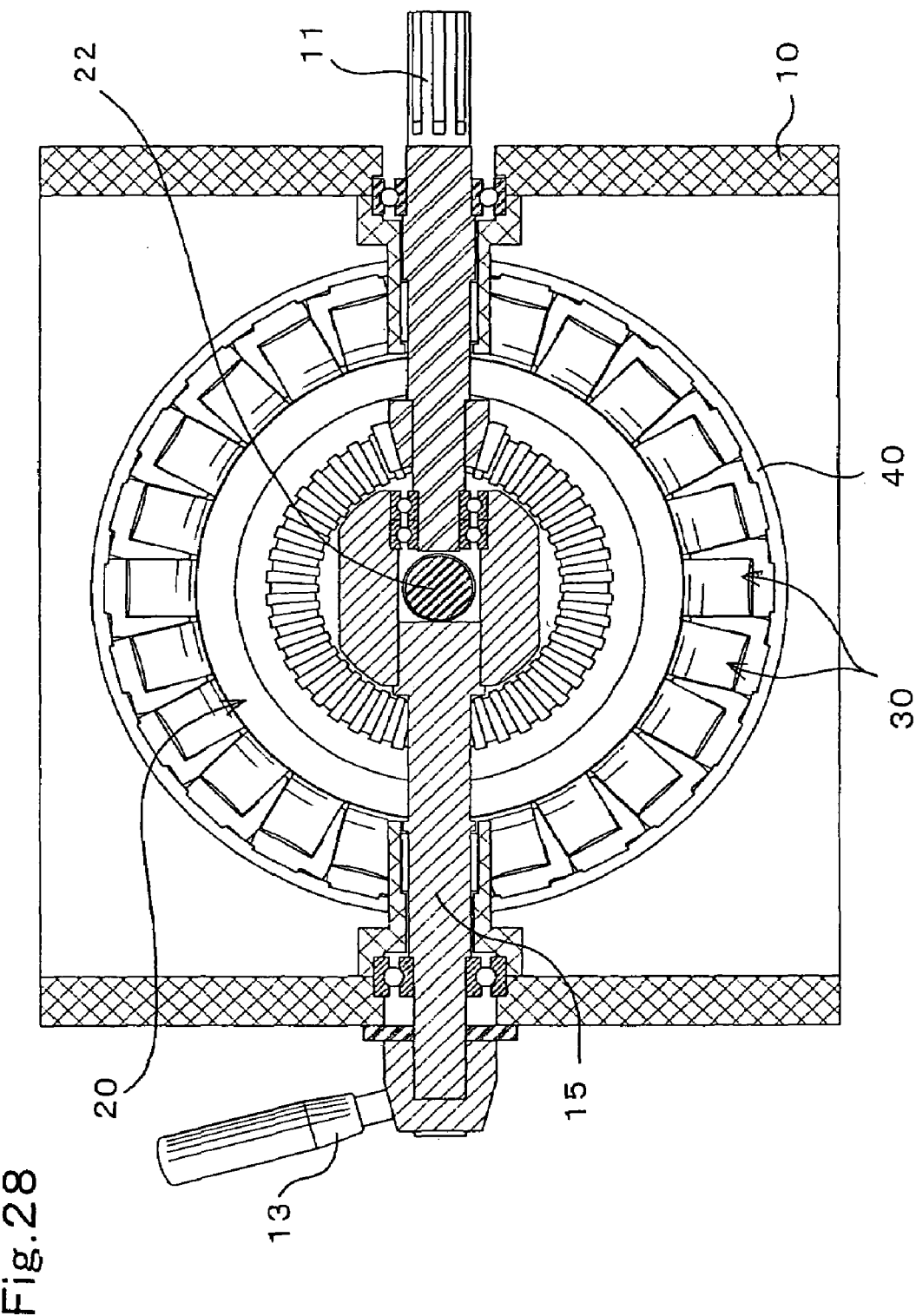

Further, many counter rollers 30 assembled into the disk 40 are formed into a toric shape with the inner edge of each roll surface 31 as shown in FIG. 28. Accordingly, when the power roller 20 is inclined into any position, the roll surface 21 of the power roller 20 and the roll surface 31 of each counter roller 30 come into line contact with each other as described above. Furthermore, the power roller 20 is always in contact with the roll surface of toric shape formed with each counter roller 30. Accordingly, the size of the power roller 20 with respect to the torus of the counter rollers 30 falls in the relationship, which has been illustrated in the above FIG. 11 (B) and as shown in FIG. 28.

Figure 31:
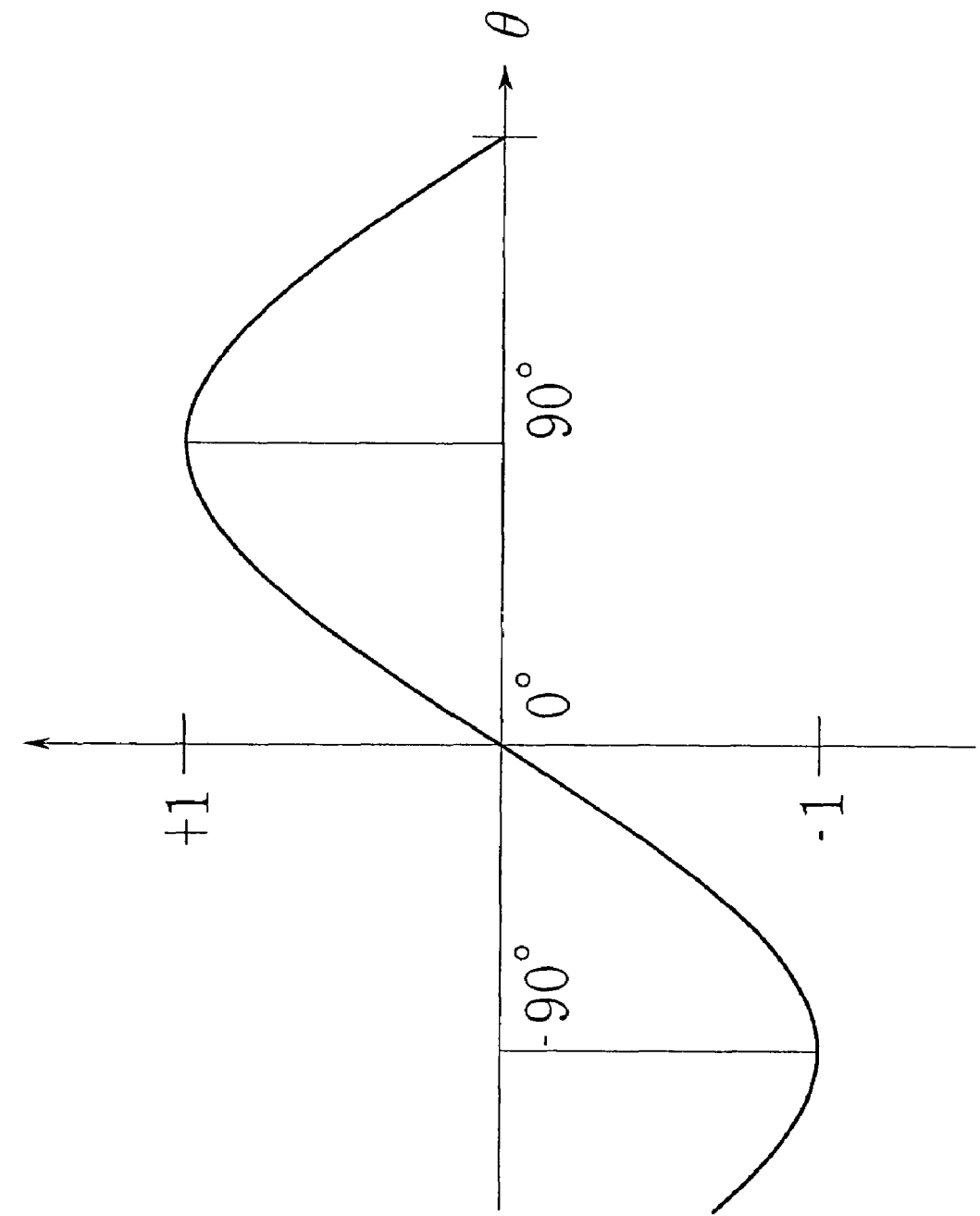
FIG. 31 is a graph showing the gear ratio obtained when the power roller 20 is inclined at an angle of the direction of the vertical axle.
Figure 33:
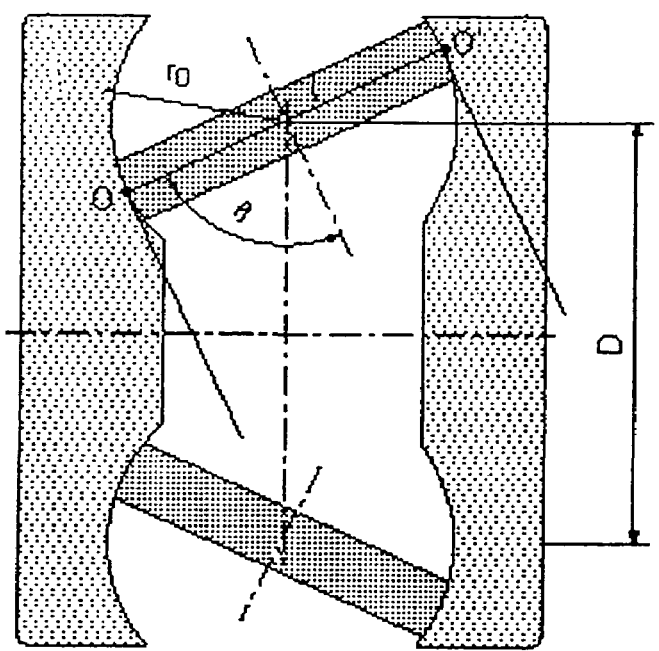
FIG. 33 is a sectional view showing a full-toroidal CVT.
Figure 34:
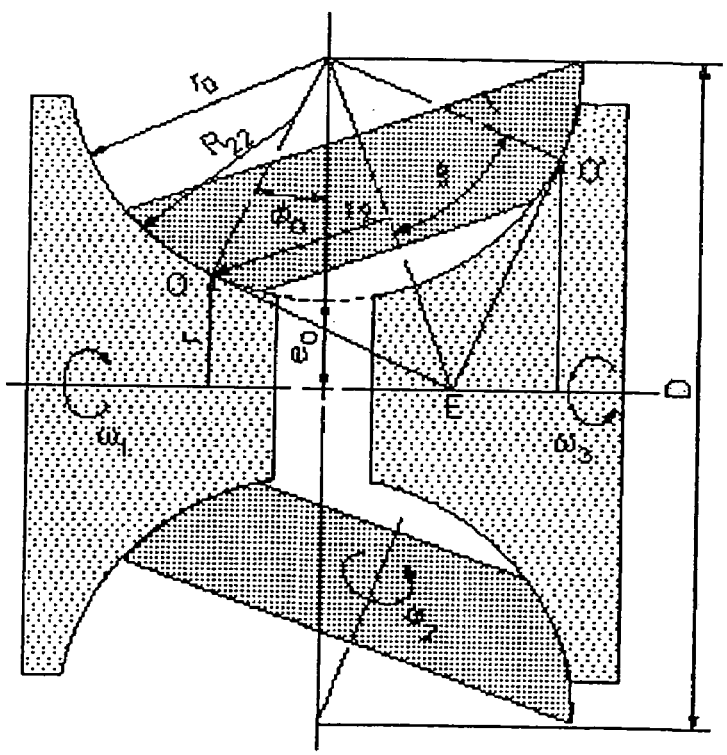
FIG. 34 is a sectional view of a half-toroidal CVT.
Figure 35:
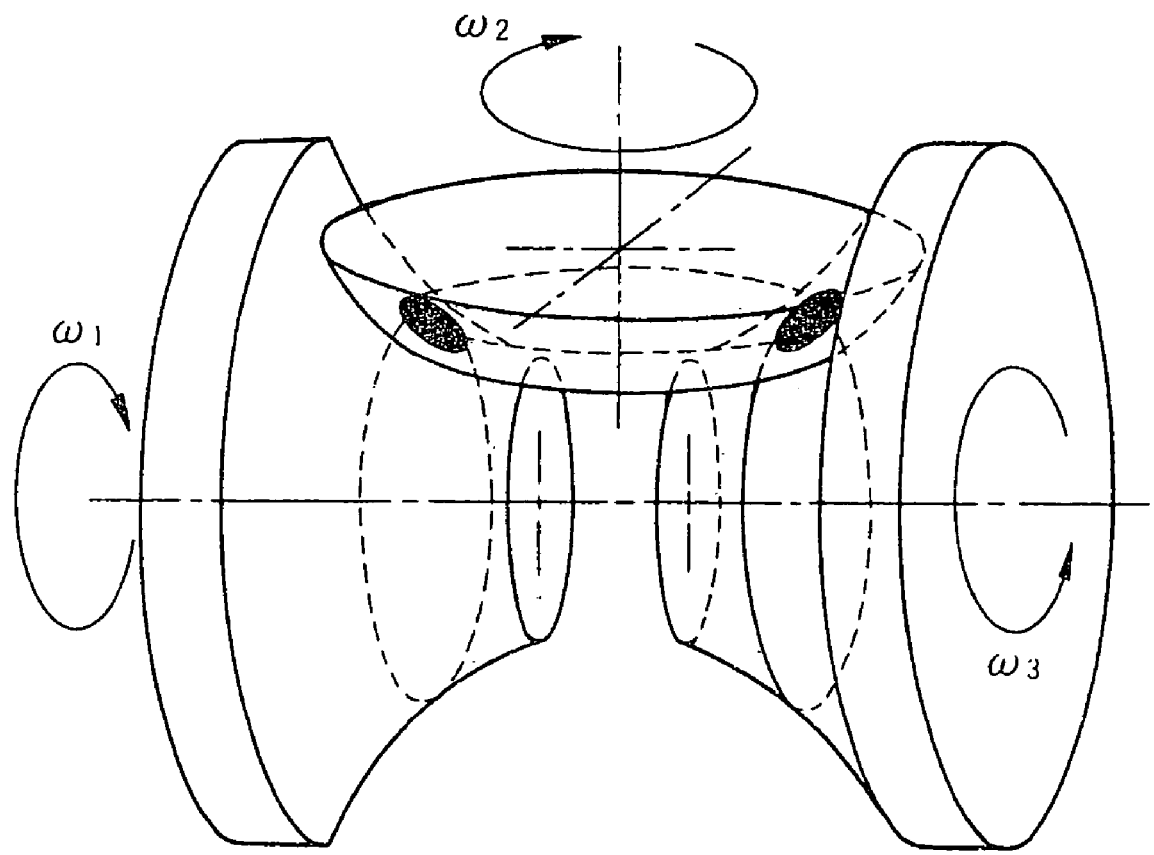
FIG. 35 is a perspective view showing the point contact in a conventional toroidal CVT.

State of the shift by the mechanical continuously variable transmission 100 according to the second embodiment is as shown in a graph of FIG. 31. In this graph, the axis of abscissas represents inclination angle of the power roller 20; the axis of ordinates represents gear ratio. The symbol minus (−) represents the rotation in the inverse direction of the rotation direction of the input axle 11.

Industrial Applicability

As described above in detail, it is possible to allow the roll surface 21 of the power roller 20 and the roll surfaces 31 of the plurality of counter rollers 30 to come into line contact with each other in the mechanical continuously variable transmission 100 of the present invention. As a result, the turning force from the input axle 11 side can be effectively transmitted to the output axle 12 side without a significant energy loss.

Also, since the power roller 20 and each of the counter rollers 30 come into line contact with each other, the power can be transmitted without strongly pressing the power roller 20 against the counter rollers 30. As a result, oil for suppressing heat generation does not need to be supplied. When the oil is supplied, it is not necessary to increase the oil pressure.

Further, by only changing the inclination angle of the power roller 20 in the mechanical continuously variable transmission 100 of the present invention, it is possible to continuously shift from the state of idling (neutral) to any of the forward/reverse rotation directions.

Accordingly, when the mechanical continuously variable transmission 100 of the present invention is used as the component of a machine tool or automobile, since the same permits not only continuous shift including reverse but also reduces energy loss for operating the same to a minimum level; thus the same is extremely useful in industry.

The invention claimed is:

1. A mechanical continuously variable transmission capable of forward and reverse rotation comprising a power roller, which is rotated by a rotation axle connected on an input axle side, in contact with a plurality of counter rollers, which are connected on an output axle, and are driven to rotate by the rotation of the power roller, wherein a concave roll surface, which forms a circular arc if it were cut off along a plane going through the rotational center axis of the counter roller, is formed on the surface of each counter roller and the plurality of counter rollers are assembled rotatably neighboring each other on the same periphery of a disk connected to the output axle, whereby the circular arcs of the concave roll surfaces form a roughly continuous circle;

a spherical roll surface is formed on the surface of the power roller so that a line which appears on the surface if the roll surface were cut off along a plane including a circle formed by said circular arcs of the counter rollers, becomes the same circular arc as the circular arc of said concave roll surfaces, whereby the power roller comes into line contact with each counter roller; and the rotation axle of the power roller is constructed and arranged so as to be continuously inclined with respect to the disk.

2. The mechanical continuously variable transmission according to claim 1, wherein only one power roller is provided, and the spherical diameter of the roll surface of the power roller is formed larger than the diameter of a torus formed inside by the counter rollers so that the power roller is pressed toward the disk side.

3. The mechanical continuously variable transmission according to claim 1, wherein a pair of the disks attached to the counter rollers respectively are assembled so as to be parallel to each other, and one power roller is disposed between the pair of the disks, so as to press the disks, toward each other.

4. The mechanical continuously variable transmission according to claim 1, wherein a plurality of power rollers having the same configuration are provided, and these power rollers are constructed and arranged so as to be rotated simultaneously in the same direction by the turning force from the input axle side.

5. The mechanical continuously variable transmission according to claim 4, wherein it is arranged so that the direction of each of the counter rollers exposed from the disk is changed and thereby the contact point of each power roller with respect to each of the counter rollers can be arbitrarily changed.

6. The mechanical continuously variable transmission according to any of claims 1 to 5, constructed and arranged so that the pressure between each of the counter rollers and the power roller is applied by leaf springs interposed between a rotation axle of each counter roller and the disk supporting the same.

7. The mechanical continuously variable transmission according to claims 6, wherein either the power roller or each of the counter rollers is adapted so as to be movable in the opposite direction of the pressure to provide such clutch function that either the power roller or each of the counter rollers is moved toward the opposite direction of the pressure and that thereby the friction contact between the power roller and each of the counter rollers is released to eliminate the transmission of the force therebetween.

8. The mechanical continuously variable transmission according to any of claims 1 to 5, constructed and arranged so that the pressure between each of the counter rollers and the power roller is applied by leaf springs interposed between the disk and a casing supporting the same.

9. The mechanical continuously variable transmission according to claims 8, wherein either the power roller or each of the counter rollers is adapted so as to be movable in the opposite direction of the pressure to provide such clutch function that either the power roller or each of the counter rollers is moved toward the opposite direction of the pressure and that thereby the friction contact between the power roller and each of the counter rollers is released to eliminate the transmission of the force therebetween.

10. The mechanical continuously variable transmission according to any of claims 1 to 5 wherein either the power roller or each of the counter rollers is adapted so as to be movable in the opposite direction of the pressure to provide such clutch function that either the power roller or each of the counter rollers is moved toward the opposite direction of the pressure and that thereby the friction contact between the power roller and each of the counter rollers is released to eliminate the transmission of the force therebetween.

* * * * *